(12) United States Patent
Hanzawa et al.

(10) Patent No.: US 10,885,618 B2
(45) Date of Patent: Jan. 5, 2021

(54) INSPECTION APPARATUS, DATA GENERATION APPARATUS, DATA GENERATION METHOD, AND DATA GENERATION PROGRAM

(71) Applicant: OMRON Corporation, Kyoto (JP)

(72) Inventors: Yuki Hanzawa, Nara (JP); Masashi Kurita, Kizugawa (JP)

(73) Assignee: OMRON Corporation, Kyoto (JP)

(*) Notice: Subject to any disclaimer, the term of this patent is extended or adjusted under 35 U.S.C. 154(b) by 128 days.

(21) Appl. No.: 16/129,129

(22) Filed: Sep. 12, 2018

(65) Prior Publication Data

US 2019/0139212 A1 May 9, 2019

(30) Foreign Application Priority Data

Nov. 7, 2017 (JP) ................................ 2017-214945

(51) Int. Cl.
*G06N 3/08* (2006.01)
*G06T 7/00* (2017.01)
(Continued)

(52) U.S. Cl.
CPC ........ *G06T 7/0002* (2013.01); *G06K 9/00523* (2013.01); *G06K 9/6256* (2013.01); *G06K 9/6263* (2013.01); *G06N 3/08* (2013.01); *G06T 7/0004* (2013.01); *G06T 7/11* (2017.01); *G06T 2207/10024* (2013.01);
(Continued)

(58) Field of Classification Search
CPC ....... G06T 7/0002; G06T 7/0004; G06T 7/11; G06T 2207/10024; G06T 2207/20084; G06T 2207/30108; G06T 2207/20081; G06K 9/6263; G06K 9/6256; G06K 9/00523; G06N 3/08
See application file for complete search history.

(56) References Cited

U.S. PATENT DOCUMENTS 10,319,094 B1 * 6/2019 Chen .................. G06F 3/0484
2003/0202703 A1   10/2003 Ogi
(Continued)

FOREIGN PATENT DOCUMENTS

JP    2003-317082 A    11/2003
JP    2016-143353 A    8/2016

OTHER PUBLICATIONS

The extended European search report dated Mar. 21, 2019 in a counterpart European Patent Application.

*Primary Examiner* — Chuong A Ngo
(74) *Attorney, Agent, or Firm* — Metrolex IP Law Group, PLLC

(57) ABSTRACT

An inspection apparatus includes: an image capturing apparatus configured to capture an image of an object to be inspected: a determination unit configured to determine, based on the image, whether or not the object to be inspected includes a defect, using an identification device that has been trained using learning data: an input unit configured to accept an input indicating whether or not a determination result by the determination unit is correct; an extraction unit configured to extract a partial image of the image based on which the determination has been made; and a generation unit configured to generate new learning data based on the partial image, if a fact that the determination result by the determination unit is not correct has been input.

17 Claims, 11 Drawing Sheets

(51) Int. Cl.
    *G06K 9/62*      (2006.01)
    *G06T 7/11*      (2017.01)
    *G06K 9/00*      (2006.01)

(52) U.S. Cl.
    CPC .............. *G06T 2207/20081* (2013.01); *G06T 2207/20084* (2013.01); *G06T 2207/30108* (2013.01)

(56) References Cited

U.S. PATENT DOCUMENTS

| | | |
|---|---|---|
| 2008/0063254 A1 | 3/2008 | Tanizaki et al. |
| 2011/0274362 A1 | 11/2011 | Isomae et al. |
| 2017/0249766 A1 | 8/2017 | Namiki et al. |
| 2019/0137409 A1* | 5/2019 | Nogami ................ G06F 3/0481 |

* cited by examiner

INSPECTION APPARATUS, DATA GENERATION APPARATUS, DATA GENERATION METHOD, AND DATA GENERATION PROGRAM

CROSS-REFERENCES TO RELATED APPLICATIONS

This application claims priority to Japanese Patent Application No. 2017-214945 filed Nov. 7, 2017, the entire contents of which are incorporated herein by reference.

FIELD

The disclosure relates to an inspection apparatus, a data generation apparatus, a data generation method, and a data generation program.

BACKGROUND

In recent years, technologies for identifying images using an identification device such as a neural network have been studied. The identification device may be trained using images and data (teaching data) including labels of the images.

With respect to effectively generating learning data, in JP 2003-317082A, a classification support apparatus is described that includes a display unit for displaying images of a plurality of objects to be inspected, an input unit for accepting inputs for classifying the images of the plurality of objects to be inspected, and a processing unit that performs processing for determining the display order of the objects to be inspected in the display unit based on the sizes or the like of the objects to be inspected shown by images of the objects to be inspected that have been prepared in advance, and processing for arranging and displaying the images of the plurality of objects to be inspected in the display unit.

Also, with respect to training of an identification device, in JP 2016-143353A, a learning apparatus is described that includes a recognition processing unit that performs recognition processing on data to be recognized (recognition data), a learning control unit that extracts a portion of the recognition data, and creates relearning data including the extracted recognition data, and a learning processing unit that learns processing parameters of the recognition processing unit using learning target data including the relearning data. Specifically, the learning control unit extracts some information, included in the recognition data that has been used in learning by the learning processing unit, that contribute more to the processing parameters in the learning, and creates relearning data in which a recognition result is added to the extracted recognition data. Furthermore, a learning apparatus is described in which the learning processing unit learns the processing parameters of the recognition processing unit such that the recognition result of the recognition processing unit with respect to the learning target data included in the relearning data matches the recognition result that has been added to the learning target data.

JP 2003-317082A and JP 2016-143353A are examples of background art.

SUMMARY

When a defect included in an object to be inspected is identified by an identification device that is created using learning data, the identification accuracy depends on the content of the learning data that is used in learning. For example, in the case of identifying, based on an image, whether or not the object to be inspected includes a defect, it is difficult to generate an identification device having a high identification accuracy, unless the learning data includes a sufficient number of and sufficient types of images in which a defect is not captured, and images in which a defect is captured.

However, there are cases where images that are easily identified by an identification device and images that are not easily identified by the identification device do not necessarily match, respectively, images that are easily identified by humans and images that are not easily identified by humans. Therefore, what types of images should be added to the learning data in order to improve the identification accuracy of an identification device may not always be obvious. Therefore, there is a need for a method for adding learning data and increasing variations thereof in order to improve the identification accuracy of the identification device such that whether or not an object to be inspected includes a defect can be identified with high accuracy.

In view of this, one or more aspects may provide an inspection apparatus, a data generation apparatus, a data generation method, and a data generation program for generating learning data with which the identification accuracy of an identification device can be improved such that whether or not an object to be inspected includes a defect can be identified with high accuracy.

An inspection apparatus according to one aspect of this disclosure includes: an image capturing apparatus configured to capture an image of an object to be inspected: a determination unit configured to determine, based on the image, whether or not the object to be inspected includes a defect, using an identification device that has been trained using learning data: a display unit configured to display the image and a determination result by the determination unit; an input unit configured to accept an input indicating whether or not the determination result is correct; an extraction unit configured to extract a partial image of the image based on which the determination has been made; and a generation unit configured to generate new learning data based on the partial image, if the input unit has accepted an input indicating that the determination result is not correct. Here, the learning data includes an image to be input to an identification device, and data, which is at least information indicating whether or not the object to be inspected captured in the image includes a defect, that can be compared with an output of the identification device. Also, the partial image of an image based on which the determination has been made includes a portion of the image that exerts a relatively large influence on the determination by the identification device.

According to an aspect, the result determined by the determination unit is verified. If the determination result is not correct, new learning data is generated based on a partial image based on which the determination has been made, and as a result, even if it is not obvious why an erroneous determination has been made, an image similar to the measurement image of the object to be inspected subject to an erroneous determination is generated, learning data with which the number of erroneous determinations can be reduced can be generated, and learning data with which identification accuracy of the identification device can be improved, and whether or not the object to be inspected includes a defect can be identified with high accuracy can be generated.

In an aspect, the generation unit may, if the determination unit has determined that the image includes a defect, and the input unit has accepted an input indicating that the determination result is not correct, generate the new learning data by associating the image with information indicating that the partial image does not include a defect.

According to an aspect, if the determination unit has determined that an image that actually does not include a defect includes a defect, learning data in which the fact that a partial image based on which the determination unit has made the determination that a defect is included does not include a defect is indicated is generated, and learning data with which the number of erroneous determinations that an image that does not actually include a defect is determined to include a defect can be reduced can be generated.

In an aspect, the generation unit may, if the determination unit has determined that the image includes a defect, and the input unit has accepted an input indicating that the determination result is not correct, generate a composite image by combining the partial image and an image that is different from the image from which the partial image has been extracted, and generate the new learning data by associating the composite image with information indicating that no defect is included.

According to an aspect, if an image that does not actually include a defect has been determined to include a defect by the determination unit, a composite image in which a partial image based on which the determination unit has determined that a defect is included is combined with an image different from the image from which the partial image has been extracted, and as a result, the variation of images that do not actually include a defect, but will be erroneously determined by the determination unit that a defect is included can be increased, and learning data with which the number of erroneous determinations can be reduced can be generated by generating images similar to the image that has been erroneously determined that a defect is included. With this, various composite images with which erroneous determination may be made are generated from one image subject to an erroneous determination, and learning data with which the identification accuracy of an identification device can be improved so that whether or not the object to be inspected includes a defect can be identified with higher accuracy can be generated.

In an aspect, the inspection apparatus may further include a verification unit that is configured to cause the determination unit to determine whether or not the composite image includes a defect, and verify whether or not a determination result similar to that obtained when the determination unit is caused to determine whether or not the image from which the partial image has been extracted includes a defect is obtained.

According to an aspect, it can be verified whether or not a composite image has been generated with which a determination result similar to that obtained on the original image that does not actually include a defect, but will be erroneously determined by the determination unit to include a defect will be obtained, and it can be confirmed whether or not the generated composite image is useful for reducing the number of erroneous determinations. Here, the similar determination result is a determination result that, when the determination unit is caused to determine whether or not the composite image includes a defect, the determination unit erroneously determines that a defect is included similarly to the image from which the partial image has been extracted (that is, a measurement image of the object to be inspected). That is, the similar determination result includes the same determination result, and a corresponding determination result.

In an aspect, the input unit may accept an input of a cause of erroneous determination by the determination unit, and the generation unit may select an image of an object to be inspected that does not include a defect, based on the cause, and generate a composite image by combining the partial image and the selected image.

According to an aspect, when the determination unit can estimate a cause of erroneous determination, a composite image for which a similar erroneous determination might be made based on the same cause can be generated, learning data with which the number of erroneous determinations can be reduced by generating an image similar to the image that has been erroneously determined that a defect is included can be generated. Here, the cause of erroneous determination by the determination unit is a cause that causes the determination unit to make erroneous determination that, although a defect is not actually included, a defect is included. For example, when the determination unit has made the erroneous determination caused by a feature of the external surface of the object to be inspected, the feature of the external surface is the cause. Specific example is a case where the background pattern is a predetermined pattern such as a hairline, and the determination unit has made the erroneous determination due to this pattern. In such a case, the type of the background pattern as a content of the captured image, the material of the object to be inspected, and the like may be accepted as input of a cause that has caused the determination unit to make erroneous determination. An image that is to be combined with a partial image can be selected based on this cause, and learning data with which the number of erroneous determinations can be reduced can be generated.

In an aspect, the input unit may accept an input of a cause of erroneous determination by the determination unit, and the display unit may display data for calling attention to a possible defect in a process of capturing an image of the object to be inspected, based on the cause.

According to this cause, when the cause of erroneous determination by the determination unit is estimated to reside in image capturing process, attention can be called to a possible defect in the image capturing process, and the number of erroneous determinations to be made by the determination unit can be reduced. Here, the cause in the image capturing process that induces erroneous determination by the determination unit includes a cause relating to the image capturing condition when capturing an image of the object to be inspected, for example. Such a cause includes a case where, as image capturing conditions, fixing position of the object to be inspected when the object to be inspected is to be captured is shifted, a portion of the image that is originally not a capturing target enters the capturing range of the image capturing apparatus, and as a result, the portion of the image becomes the cause of erroneous determination, for example. Also, such a case includes a case where, as image capturing conditions, a parameter of the lighting condition when the object to be inspected is to be captured is defective, an identification device makes a determination using an image captured in an erroneous lighting condition, and as a result, erroneous determination is made, for example. In these cases, as a result of pointing out that there may be a defect in the image capturing condition in the image capturing process, the number of erroneous determinations to be made by the determination unit can be reduced.

In an aspect, the extraction unit may extract the partial image based on which the determination has been made such that a region of the image whose degree of contribution to the determination result is a predetermined value or more is included.

According to an aspect, a partial image based on which the determination unit has made the erroneous determination is extracted, new learning data can be generated based on a partial image that includes a feature that the identification device is not good at recognizing, and as a result, learning data with which the identification accuracy of the identification device can be improved can be generated.

In an aspect, the determination unit may determine whether or not the image includes a plurality of defects, the input unit may accept an input indicating, for each of the plurality of defects, whether or not the determination result is correct, the extraction unit may extract a partial image of the image based on which the determination has been made regarding one of the plurality of defects, with respect to which the input unit has accepted an input indicating that the determination result is not correct, and the generation unit may generate new learning data based on the partial image.

According to an aspect, if the determination unit has determined that an image that does not actually include a defect includes a plurality of defects, new learning data is generated based on a partial image based on which the determination has been made, and as a result, even if it is not obvious why an erroneous determination that a defect is included has been made, an image similar to the image subject to an erroneous determination is generated, and learning data with which the number of erroneous determinations can be reduced can be generated.

In an aspect, the inspection apparatus may further include a communication unit configured to inquire of an authorized person as to whether or not the new learning data should be registered, when the generation unit generates the new learning data.

According to an aspect, when new learning data is generated, as a result of inquiring of an authorized person whether or not the new learning data is to be registered, the new learning data is prevented from being easily registered, and learning data having an appropriate content can be accumulated.

In an aspect, the display unit may display the image and an image in which a partial image of the image is emphasized.

According to an aspect, a part of an image based on which the determination unit has determined that the image includes a defect can be visually recognized, and as a result of comparing the original image with the image in which the partial image has been emphasized, it can be easily confirmed whether the determination unit correctly determined that an image that actually includes a defect includes a defect, or the determination unit erroneously determined that an image that does not actually include a defect includes a defect.

In an aspect, the display unit may display the image and an image in which a partial image of the image is emphasized such that these images can be compared to each other, or in a superimposed manner.

According to an aspect, an image in which a partial image has been emphasized and the original image are displayed such that these images can be compared to each other, or are displayed in a superimposed manner, a portion of the image based on which the determination unit has made its determination can be correctly compared with the original image, and as a result, it can be easily confirmed whether the determination unit correctly determined that an image that actually includes a defect includes a defect, or the determination unit erroneously determined that an image that does not actually include a defect includes a defect.

In an aspect, the display unit may display the image and identification information of the object to be inspected.

According to an aspect, since the identification information of an object to be inspected is displayed, the object to be inspected itself can be obtained, and whether or not the object to be inspected includes a defect can be visually verified or the object to be inspected can be kept as a sample.

In an aspect, the display unit may display the image and an image of an object to be inspected including a defect that was acquired in the past or an image of the object to be inspected not including a defect that was acquired in the past.

According to an aspect, the current image can be compared with a past example of the image that includes a defect and a past example of the image that does not include a defect, and as a result, material for determining whether or not the result determined by the determination unit is correct can be provided.

In an aspect, the display unit may display the image and an image determined, in the past, by the determination unit to include a defect, or an image determined, in the past, by the determination unit to not include a defect.

According to an aspect, the current image can be compared with a past example of the image that was determined to include a defect by the determination unit and a past example of the image that was determined to not include a defect by the determination unit, and as a result, material for determining whether or not the result determined by the determination unit is correct can be provided.

A data generation apparatus according to another aspect to this disclosure includes: an acquisition unit configured to acquire an image of an object to be inspected; a determination unit configured to determine, based on the image, whether or not the object to be inspected includes a defect, using an identification device that has been trained using learning data; an input unit configured to accept an input indicating whether or not a determination result by the determination unit is correct; an extraction unit configured to extract a partial image of the image based on which the determination has been made; and a generation unit configured to, if the input unit has accepted an input indicating that the determination result is not correct, generate new learning data based on the partial image.

According to an aspect, the result determined by the determination unit is verified, when the determination result is not correct, if the determination unit has determined that an image that actually does not include a defect includes a defect, new learning data is generated based on a partial image based on which the determination has been made. As a result, even if it is not obvious why an erroneous determination that the image includes a defect has been made, an image similar to the image of the object to be inspected with which erroneous determination that a defect is included has been made is generated, learning data with which the number of erroneous determinations can be reduced can be generated, and learning data with which identification accuracy of the identification device can be improved, and whether or not the object to be inspected includes a defect can be identified with high accuracy can be generated.

A data generation method according to another aspect to this disclosure includes: acquiring an image of an object to be inspected; determining based on the image, whether or not the object to be inspected includes a defect, using an identification device that has been trained using learning data; accepting an input indicating whether or not a determination result obtained in the determining is correct; extracting a partial image of the image based on which the determination has been made; and generating new learning data based on the partial image, if an input indicating that the determination result is not correct has been accepted in the step of accepting an input.

According to an aspect, the result determined by the determination unit is verified, when the determination result is not correct, new learning data is generated based on a partial image based on which the determination has been made. As a result, even if it is not obvious why an erroneous determination has been made, an image similar to the image of the object to be inspected with which erroneous determination that a defect is included has been made is generated, learning data with which the number of erroneous determinations can be reduced can be generated, and learning data with which identification accuracy of the identification device can be improved, and whether or not the object to be inspected includes a defect can be identified with high accuracy can be generated.

A data generation program according to another aspect to this disclosure causes a computation apparatus included in a data generation apparatus to function as: an acquisition unit configured to acquire an image of an object to be inspected; a determination unit configured to determine, based on the image, whether or not the object to be inspected includes a defect, using an identification device that has been trained using learning data; an input unit configured to accept an input indicating whether or not a determination result by the determination unit is correct; an extraction unit configured to extract a partial image of the image based on which the determination has been made; and a generation unit configured to, if the input unit has accepted an input indicating that the determination result is not correct, generate new learning data based on the partial image.

According to an aspect, the result determined by the determination unit is verified, when the determination result is not correct, new learning data is generated based on a partial image based on which the determination has been made. As a result, even if it is not obvious why an erroneous determination has been made, an image similar to the image of the object to be inspected with which erroneous determination that a defect is included has been made is generated, learning data with which the number of erroneous determinations can be reduced can be generated, and learning data with which identification accuracy of the identification device can be improved, and whether or not the object to be inspected includes a defect can be identified with high accuracy can be generated.

Provided are an inspection apparatus, a data generation apparatus, a data generation method, and a data generation program for generating learning data with which the identification accuracy of an identification device can be improved, and whether or not the object to be inspected includes a defect can be identified with high accuracy.

DETAILED DESCRIPTION

Hereinafter, one or more embodiments according to one or more aspects (hereinafter, referred to as "one or more embodiments") will be described based on the drawings. Note that constituent elements having the same or similar configurations are denoted by the same reference signs.

1. Application Example

Figure 1:
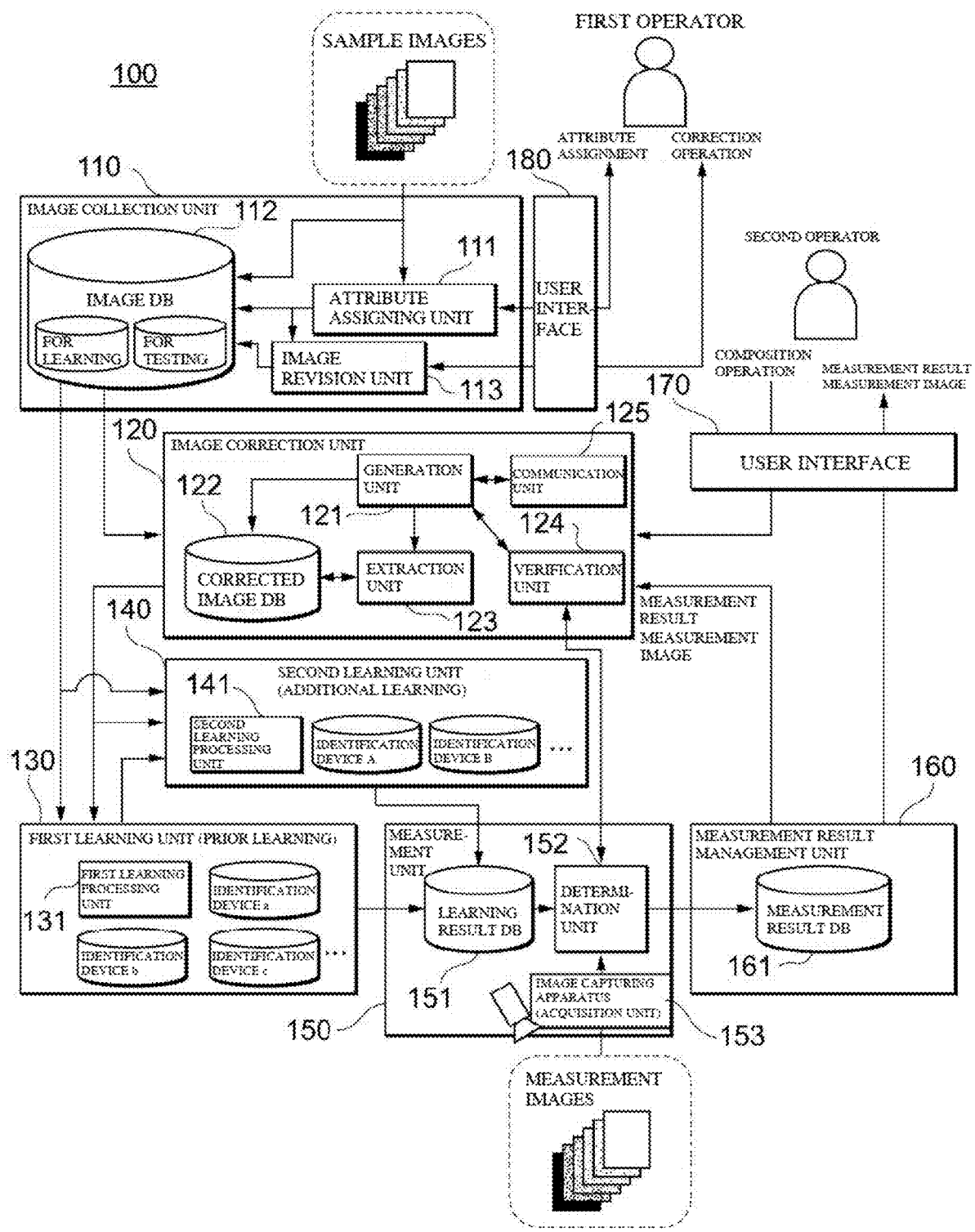
FIG. 1 is a functional block diagram illustrating an inspection apparatus according to one or more embodiments.

First, an example of a situation in which one or more aspects are applied will be described using FIG. 1. FIG. 1 is a functional block diagram schematically illustrating an example of a situation in which an inspection apparatus 100 according to one or more embodiments is applied. The inspection apparatus 100 according to one or more embodiments is an apparatus that determines whether or not an image of an object to be inspected captured by an image capturing apparatus 153 includes a defect, using identification devices (a, b, c, A, B, . . . ) that have been trained by a first learning unit 130 and a second learning unit 140. If the identification devices erroneously determine (erroneous determination), specifically, determine that an image that actually does not include a defect includes a defect, the inspection apparatus 100 generates new learning data for reducing erroneous determinations. The inspection apparatus 100 according to one or more embodiments includes a data generation apparatus that generates data for training the identification devices.

As shown in FIG. 1, the inspection apparatus 100 includes an image capturing apparatus 153 that acquires an image of an object to be inspected, a determination unit 152 that includes the identification devices (a, b, c, A, B, . . . ) that have been trained using learning data, and into which image data is input, determines whether or not an object to be inspected includes a defect, and outputs a determination result including information indicating whether or not the object to be inspected includes a defect, a user interface 170 that accepts an input indicating whether or not the result determined by the determination unit 152 is correct, an extraction unit 123 that extracts a partial image of an image based on which the determination unit 152 made its determination, and a generation unit 121 that generates, if an input indicating that the result determined by the determination unit 152 is not correct was entered into the user interface 170, new learning data based on the partial image. Here, the image capturing apparatus 153 is an example of an "acquisition unit" of one or more embodiments. Also, the user interface 170 is an example of an "input unit" of one or more embodiments. In this specification, an image of an object to be inspected that is newly captured by the image capturing apparatus 153 is referred to as a "measurement image", and images of objects to be inspected that have been collected in advance for training the identification devices (a, b, c, A, B, . . . ) are referred to as "sample images". Note that the inspection apparatus 100 need not include the image capturing apparatus 153, and may also acquire a measurement image from an image capturing apparatus that is provided separately.

Based on a measurement image, the determination unit 152 determines whether or not an object to be inspected includes a defect using the identification devices that use a neural network such as a convolutional neural network (hereinafter, referred to as "CNN"), for example, and outputs a determination result including information indicating whether or not the object to be inspected includes a defect. The result determined by the determination unit 152 is displayed in the user interface 170 of a second operator along with the measurement image. The second operator confirms the measurement image and the determination result, and makes an input indicating whether or not the result determined by the determination unit 152 is correct using the user interface 170. Here, if the input indicates that the result determined by the determination unit 152 is not correct, the generation unit 121 generates new learning data based on a partial image, of the measurement image, based on which the determination has been made. The generated new learning data is stored in a corrected image DB 122, and is used to train the identification devices (a, b, c, A, B, . . . ) with the first learning unit 130 and the second learning unit 140. Note that the partial image, of an image, based on which the determination has been made includes a portion of the image that exerts a relatively large influence on the determination by the identification device, and can be extracted so as to include a region of the image whose degree of contribution to the result determined by the identification device is a predetermined value or more, if the identification device is constituted by a CNN, for example. If the identification device is constituted by a CNN, for example, the partial image, of an image, based on which the determination has been made may include a region, of the image, at which the values of a feature map of the layer corresponding to the result determined by the identification device are at least a predetermined threshold value or more. The extraction unit 123 extracts a partial image based on which the determination has been made so as to include a region, of the image, whose degree of contribution on the result determined by the determination unit 152 has at least a predetermined value, and as a result, the partial image based on which the determination unit 152 has made the erroneous determination is extracted, new learning data can be generated based on the partial image that includes a feature that is not easily identified by the identification device, and learning data with which the identification accuracy of the identification device is improved can be generated.

Accordingly, the determination result determined by the determination unit 152 is verified, if the determination result is not correct, an input indicating that the determination result is not correct is made, and new learning data is generated based on a partial image based on which the determination has been made, and as a result, even if it is not obvious why an erroneous determination has been made, an image similar to the measurement image of the object to be inspected with which erroneous determination has been made is generated, learning data with which the number of erroneous determinations can be reduced can be generated, and learning data with which the identification accuracy of the identification device can be improved, and whether or not the object to be inspected includes a defect can be identified with high accuracy can be generated. Therefore, computation for analyzing the cause of an erroneous determination by the identification device need not be performed, and an identification device whose determination accuracy is high with a small computation amount can be generated. Also, it is possible to increase the variation of images that are likely to lead to the erroneous determination that a defect is included, and as a result, the occurrence of over-learning in learning processing of the identification device can be suppressed relative to the case where only the images subject to an erroneous determination are used as the learning data.

2. Exemplary Configuration

Functional Configuration

Next, an example of a functional configuration of the inspection apparatus 100 according to one or more embodiments will be described using FIG. 1. The inspection apparatus 100 includes a function of generating, using learning data, an identification device that determines whether or not an object to be inspected includes a defect, and outputs, if the object to be inspected includes a defect, attribute information (label) that includes a position of the defect and a type of the defect. Here, if the object to be inspected includes a plurality of defects, the attribute information may include the fact that these defects are included, the positions of the plurality of defects, and the types of these defects. Also, the inspection apparatus 100 includes a function of acquiring a measurement image obtained by measuring the object to be inspected, and outputting attribute information of the object to be inspected using the generated identification device. Therefore, the inspection apparatus 100 functions as an inspection apparatus or an inspection system that acquires a measurement image of the object to be inspected, and, based on the measurement image, outputs a measurement result including information indicating whether or not the object to be inspected includes a defect.

As shown in FIG. 1, the inspection apparatus 100 includes an image collection unit 110 that generates and stores learning data, an image correction unit 120 that corrects a measured image (measurement image) based on information indicating correctness in the attribute information output from the identification device, a first learning unit 130 and the second learning unit 140 that generate the identification devices that output attribute information including information indicating whether or not the object to be inspected includes a defect, and, if the object to be inspected includes a defect, a position of the defect and a type of the defect, using learning data generated by at least one of the image collection unit 110 and the image correction unit 120, a measurement unit 150 that acquires a measurement image obtained by measuring an object to be inspected, and outputs attribute information of the object to be inspected using identification devices generated by at least one of the first learning unit 130 and the second learning unit 140, and a measurement result management unit 160 that stores a measurement result in which the measurement image is associated with its attribute information. Here, the measurement result includes a measurement image, attribute information of the object to be inspected output from the identification devices, and a result determined by the determination unit 152. Note that the learning data is not limited to single learning data, and may be a data set that includes a set of learning data.

Here, the defect is an anomaly included in the object to be inspected, and may be a scratch, unevenness in the color or the like, contamination, a chip, burring, foreign matter, blurred printing, or printing misalignment, for example.

Also, the attribute information includes at least information indicating whether or not the image includes a defect, and if the image includes a defect, information indicating the position of the defect and information indicating the type of the defect. Note that the attribute information is not limited to information whether or not a defect is included, information indicating the position of a defect, and information indicating the type of a defect, and may also include information indicating the reliability of the information indicating whether or not a defect is included, information indicating the position of a defect, and information indicating the type of the defect that are output from the identification devices.

The inspection apparatus 100 is constituted by one or more information processing apparatuses that include a storage unit (auxiliary storage units 102 and 103 shown in FIG. 4, for example) that stores a software program and data used when the software program is executed, and a computation unit (processor 104, shown in FIG. 4, for example) that calls and executes a software program. That is, the functional blocks, namely the image collection unit 110, the image correction unit 120, the first learning unit 130, the second learning unit 140, the measurement unit 150, and the measurement result management unit 160, are realized by executing a predetermined software program stored in the storage unit such as the auxiliary storage unit 102 or 103 with the hardware processor such as the processor 104. That is, the functions of the image collection unit 110, the image correction unit 120, the first learning unit 130, second learning unit 140, the measurement unit 150, and the measurement result management unit 160 respectively indicate predetermined processing that is realized by a software program being executed by the hardware processor. Also, the image collection unit 110, the image correction unit 120, the first learning unit 130, the second learning unit 140, the measurement unit 150, and the measurement result management unit 160 are each configured as an information processing apparatus separately or together with other functional units. Note that the inspection apparatus 100 may also be configured by a single information processing apparatus. The hardware configuration of the information processing apparatus in one or more embodiments will be described later.

Configuration of Image Collection Unit

The image collection unit 110 acquires sample images for generating learning data. The sample images may be images obtained by capturing an object to be inspected, or CG images generated using a known image composition technology. Attribute information is assigned to each sample image collected by the image collection unit 110, or to a plurality of the images by the attribute assigning unit 111. That is, the attribute assigning unit 111 obtains learning data by assigning attribute information to the sample images.

In one or more embodiments, assignment of the attribute information (labeling) is performed by a first operator via a user interface 180. For example, if a sample image includes a defect, the first operator can assign attribute information that includes information indicating that a defect is included and the position of the defect by enclosing the defect with a frame having a predetermined shape, using a display apparatus (such as a liquid crystal display apparatus) and an input apparatus (such as a touch panel, a keyboard, or a mouse) serving as the user interface 180. Also, attribute information including the type of the defect can also be assigned to the sample image using the user interface 180. Note that the method of assigning the attribute information is not specifically limited. For example, attribute information may be automatically assigned to an image using an identification device that has already learned a relationship between images and attribute information to be assigned to the images, or attribute information may be assigned to clusters that are obtained by clustering a plurality of images using a known statistical method.

The images (learning data) that have been assigned with respective pieces of attribute information by the attribute assigning unit 111 are stored in an image database (hereinafter, referred to as an "image DB") 112.

The image collection unit 110 includes an image revision unit 113 that extends the learning data in accordance with the number of acquired sample images and the volume of learning data stored in the image DB 112, for example. The image revision unit 113 may extend the sample images based on a revision operation performed by the first operator via the user interface 180. Note that the image revision unit 113 is not an element that is necessarily essential to the image collection unit 110. Also, "extension of learning data" refers to augmentation for increasing the data set used for learning.

Extension (augmentation) of the learning data may be performed by translating, rotating, changing in color of, enlarging, or reducing the sample image, for example. Note that the image revision unit 113 is not a constituent element that is essential to the image collection unit 110, and may be provided as appropriate according to the amount of necessary learning data required for image measurement processing that is realized using the inspection apparatus 100. Also, the aforementioned augmentation may be realized by an operator him/herself instructing types of processing such as extraction of a partial image or composition (combination) with a background image via any user interface 180. The learning data extended by the image revision unit 113 is stored in the image DB 112.

Here, the background image is an image to be combined with a partial image, and includes an image that is different from a measurement image from which the partial image has been extracted. Note that the background image may also be a measurement image. When a measurement image is used as the background image, the region of the measurement image at which an image is combined can be limited such that a partial image is to be combined with a region other than the region where the extracted partial image was present in the measurement image. The background image may also be generated based on an image other than the measurement image, and may or may not include the same pattern as the measurement image in a region other than the defect. Also, the background image may be any of various types of images such as an image having a uniform background pattern, an image including a hairline-like background pattern, and an image in which text and the like are printed.

The image DB 112 acquires learning data from the attribute assigning unit 111 and the image revision unit 113. The image DB 112 may store the learning data in a state in which it is classified based on the given attribute information. Also, if attribute information has already been given to a sample image acquired by the image collection unit 110, the image DB 112 may acquire and store the sample image without passing it through the attribute assigning unit 111 and the image revision unit 113. Note that, when the image DB 112 stores the learning data, the learning data may be distinguished between learning data for learning processing that is to be used in learning processing for generating a later-described identification device and test data for evaluation processing for evaluating whether or not the generated identification device outputs the desired attribute information. Of course, the learning data may also be stored in the image DB 112 without distinguishing between learning data and test data, and when learning processing is performed, the data set stored in the image DB 112 may be sorted into data for learning and data for testing using any method.

Configuration of First Learning Unit

Figure 2:
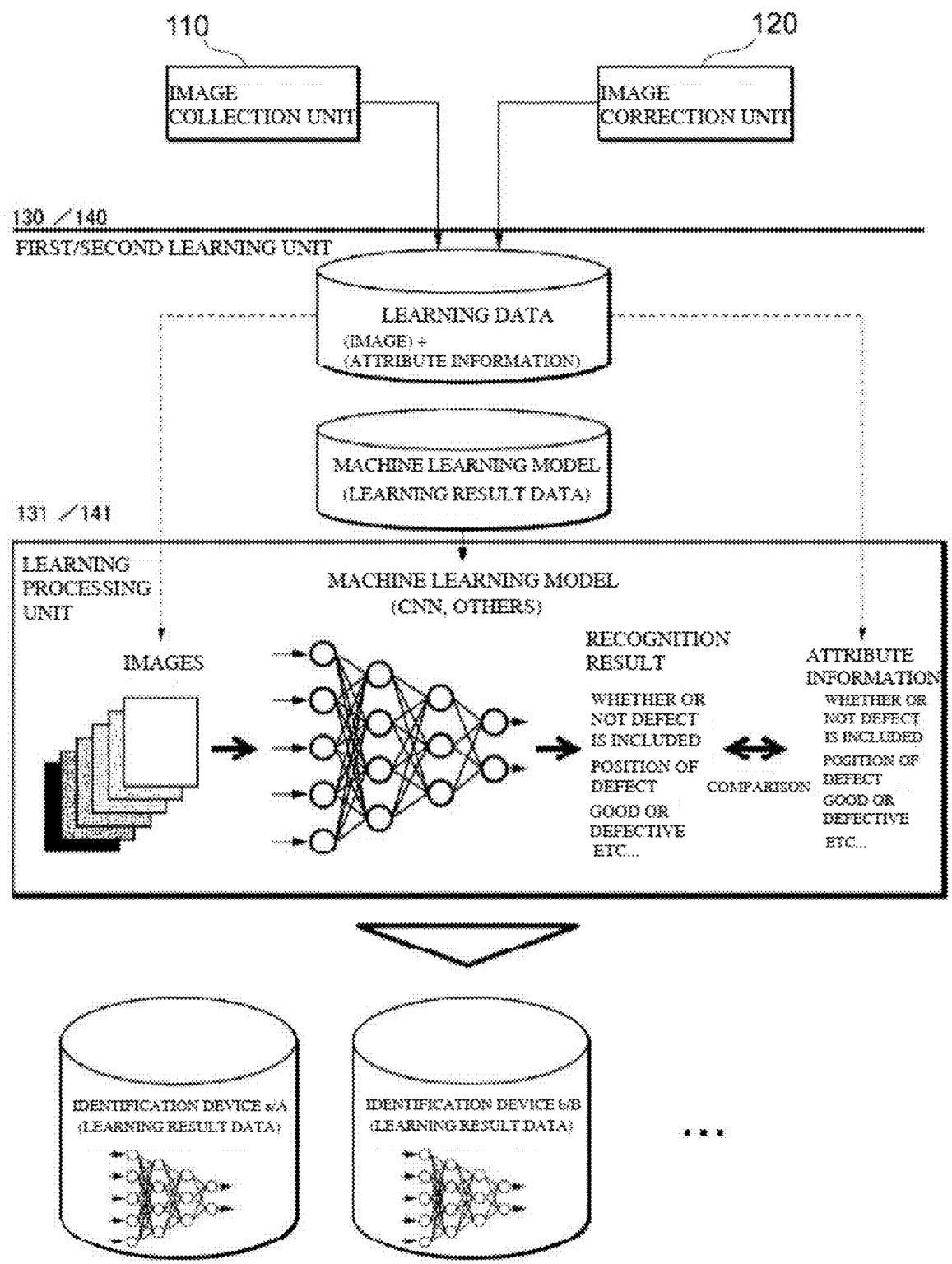
FIG. 2 is a conceptual diagram illustrating processing in a first learning unit and a second learning unit of an inspection apparatus according to one or more embodiments.

FIG. 2 is a conceptual diagram illustrating the processing in the first learning unit 130 and the second learning unit 140 of the inspection apparatus according to one or more embodiments. The first learning unit 130 acquires learning data from the image collection unit 110. Note that the first learning unit 130 may also acquire learning data from the later-described image correction unit 120. The first learning unit 130 includes a first learning processing unit 131 that executes machine learning using the acquired learning data and generates identification devices (a, b, c . . . ). The identification devices (a, b, c . . . ) receive image data as input, and output attribute information including information indicating whether or not the image includes a defect, and if one or more defects are included, the position and type of each defect. Note that data other than the image data may be input to the identification devices (a, b, c . . . ). For example, conditions (such as a light amount and an exposure time of the image capturing apparatus) with which an image of the object to be inspected has been captured or identification information of the object to be inspected may be input to the identification devices (a, b, c . . . ).

The identification devices (a, b, c . . . ) are generated by performing learning processing and evaluation processing with any machine learning model. A machine learning model is a model that includes a predetermined model structure and processing parameters that change according to the learning processing, and whose identification accuracy improves as a result of the processing parameters being optimized based on experience obtained from the learning data. That is, a machine learning model is a model in which optimum processing parameters are learned by learning processing. The algorithm to be used in the machine learning model may be a support vector machine, logistic regression, or a neural network, for example, but the type thereof is not specifically limited. In one or more embodiments, an example is described in which a CNN optimized for image recognition is used, which is an example selected from deep neural networks (hereinafter, referred to as "DNNs"), which are neural networks specifically having three or more layers. Note that the first learning unit 130 may include a model generation unit (not shown) for generating the machine learning model. Alternatively, the first learning unit 130 may acquire a machine learning model that has been generated in advance from the outside.

The first learning processing unit 131 performs, using the learning data, learning processing for training the machine learning model so as to, when image data is input, output an output value corresponding to the attribute of the measurement image that is expressed by the attribute information. The first learning processing unit 131 further performs, using test data, evaluation processing with the identification devices (a, b, c . . . ) that have been generated by the learning processing in which the outputs of the identification devices (a, b, c . . . ) are compared with attribute information given to the test data. If the outputs of the identification devices (a, b, c . . . ) match the attribute information given to the test data, it is determined that the conditions to generate the identification devices (a, b, c . . . ) are satisfied, and processing for generating the identification devices (a, b, c . . . ) is ended.

The first learning unit 130 outputs information including the model structure and the processing parameters of the generated identification devices (a, b, c . . . ) to the later-described measurement unit 150 and second learning unit 140, as the learning result data.

Configuration of Second Learning Unit

Next, the processing to be performed by the second learning unit 140 will be described using FIG. 2. The second learning unit 140 performs additional training (relearning) on an identification device that has been generated by predetermined generation processing. Note that constituent elements of the second learning unit 140 that are the same as those of the first learning unit 130 will not be described.

The second learning unit 140 acquires the learning result data of the identification devices (a, b, c . . . ) that have been generated and trained by the first learning unit 130. Note that the second learning unit 140 may acquire learning result data relating to an identification device that has been generated by predetermined generation processing from the outside. The second learning unit 140 acquires learning data from the image collection unit 110. Note that the second learning unit 140 may also acquire the learning data from the later-described image correction unit 120.

The second learning unit 140 includes a second learning processing unit 141 that executes additional training (relearning) by machine learning using learning data, and generates identification devices (A, B, C . . . ). The identification devices (A, B, C . . . ) are generated by performing learning processing and evaluation processing with the identification devices (a, b, c . . . ) that have been generated by the predetermined learning processing. In other words, the second learning processing unit 141 generates the identification devices (A, B, C . . . ) by executing, using learning data, learning processing and evaluation processing with the learning result data including the model structure and the processing parameters of the identification devices (a, b, c . . . ). The identification devices (A, B, C . . . ) receive image data as input and output attribute information including information indicating whether or not the image includes a defect, and if one or more defects are included, the position and type of each defect.

The second learning processing unit 141 performs, using learning data, learning processing (learning processing for additional training) for training a machine learning model expressed by the learning result data of the identification devices (a, b, c . . . ) such that, when image data is input, an output value corresponding to an attribute of the measurement image that is expressed by the attribute information is output. Here, the learning processing of additional training performed by the second learning processing unit 141 may be performed using learning data acquired by the later-described image correction unit 120. With this, learning data that has been newly generated based on an image obtained by capturing an object to be inspected can be used, and the identification accuracy of the identification device can be improved.

The second learning processing unit 141 further subjects the identification devices (A, B, C . . . ) that have been generated by the learning processing to evaluation processing in which, using test data, the outputs of the identification devices (A, B, C . . . ) are compared with attribute information given to the test data. When the outputs of the identification devices (A, B, C . . . ) match the attribute information given to the test data, it is determined that the conditions for generating the identification devices (A, B, C . . . ) are satisfied, and the processing for generating the identification devices (A, B, C . . . ) is ended. Here, the evaluation processing performed by the second learning processing unit 141 may be performed using test data acquired from the later-described image correction unit 120. With this, evaluation can be performed using learning data that has been newly generated based on an image obtained by capturing the object to be inspected, and the recognition accuracy of the identification devices can be improved.

The second learning unit 140 outputs information including the model structure and the processing parameters of the identification devices (A, B, C . . . ) to the later-described measurement unit 150, as learning result data.

Note that it is also possible that the first learning unit 130 and the second learning unit 140 are configured integrally, and the first learning processing unit 131 executes the learning processing and the evaluation processing of the additional training.

Configuration of Measurement Unit

Figure 3:
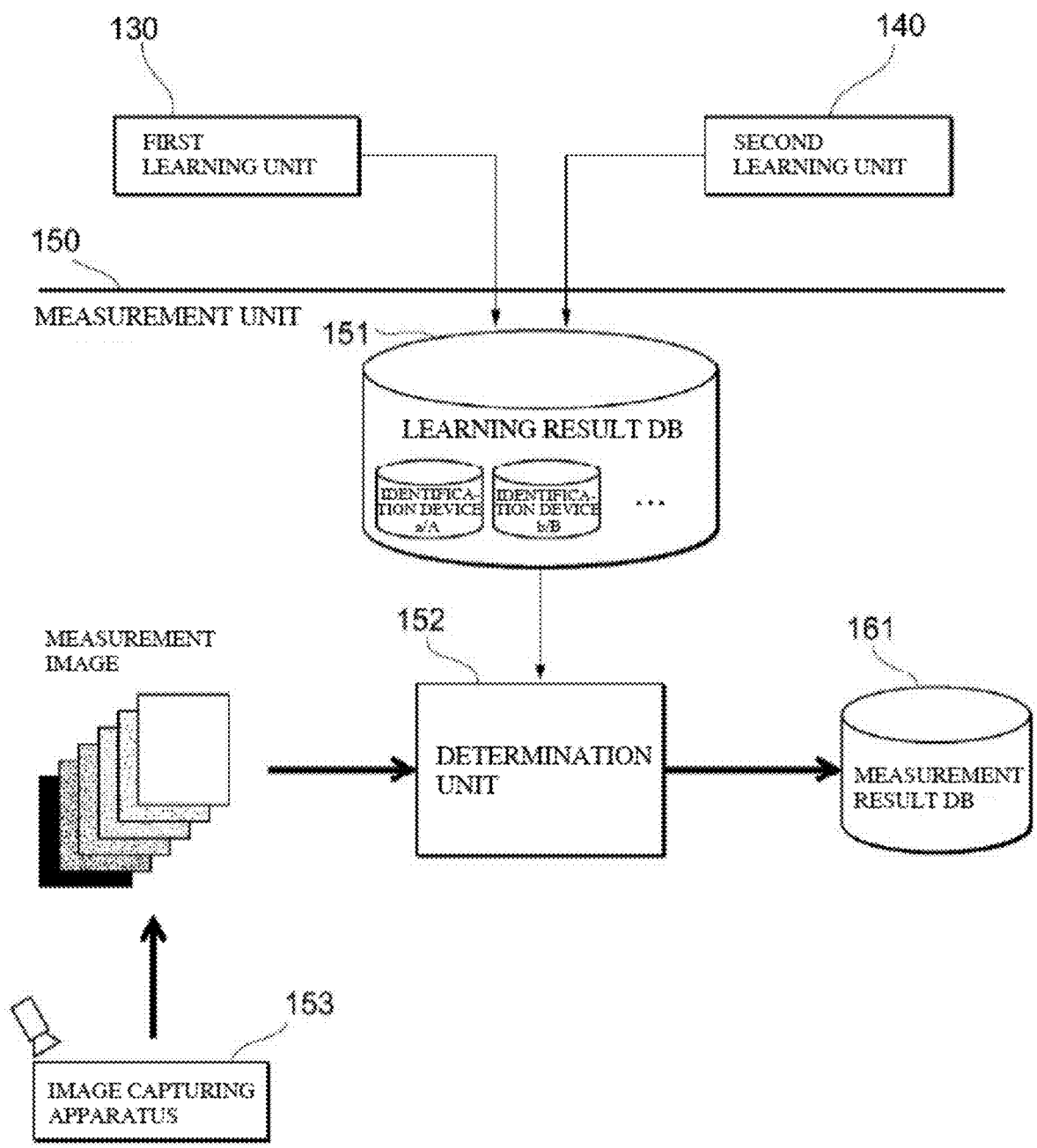
FIG. 3 is a conceptual diagram illustrating processing in a measurement unit of an inspection apparatus according to one or more embodiments.

FIG. 3 is a conceptual diagram illustrating the processing that is performed by the measurement unit 150 of the inspection apparatus 100 according to one or more embodiments. The measurement unit 150 causes the identification devices that have been generated by the learning processing and the evaluation processing using learning data to output attribute information of a measurement image of an object to be inspected captured by the image capturing apparatus 153, determines whether or not the object to be inspected includes a defect using the determination unit 152, and outputs a measurement result including the measurement image, the attribute information, and the determination result. The attribute information includes information indicating whether or not a defect is included, and if one or more defects are included, the position and the type of each defect.

The measurement unit 150 acquires, from the first learning unit 130 and the second learning unit 140, information including the model structures and the processing parameters of the identification devices, as the learning result data. The measurement unit 150 includes a learning result DB 151 that stores acquired learning result data. Also, the measurement unit 150 includes the image capturing apparatus 153 that captures the object to be inspected. The image capturing apparatus 153 may be installed so as to capture a production line of a factory, and may constitute a portion of the production line, for example. The image capturing apparatus 153 may capture images, as measurement images, of components and products (hereinafter, components and products may be collectively referred to as "works") serving as objects to be inspected that flow (are transported) in the production line.

The measurement unit 150 includes the determination unit 152 that outputs attribute information of the measurement image using an identification device that is configured based on the learning result data stored in the learning result DB 151. The determination unit 152 determines whether or not the object to be inspected includes one or more defects based on the measurement image, and if a defect is included, may output attribute information including information indicating the position of the defect on the measurement image. Here, the information indicating the position of the defect on the measurement image may be a frame indicating a region corresponding to the defect on the measurement image.

The measurement unit 150 outputs, to the measurement result management unit 160, measurement results that include the measurement image, the attribute information of the measurement image output from the identification device, and the result determined by the determination unit 152. Note that the measurement unit 150 may also output identification information for identifying individual objects to be inspected to the measurement result management unit 160 along with the measurement results. Here, the identification information of the object to be inspected may be acquired from the measurement image, or may be acquired from the outside via a predetermined interface. A production number or a figure obtained by coding the production number may be used as the identification information, for example. Therefore, the identification information is preferably information with which objects to be inspected can be individually identified. Note that the measurement unit 150 may output the result of measurement on a measurement target to a unit other than the measurement result management unit 160. For example, the measurement unit 150 may also output the measurement results and the identification information to the later-described user interface 170. Alternatively, the measurement unit 150 may also directly or indirectly output the measurement results to a sorting apparatus (not shown), for example. The sorting apparatus sorts the object to be inspected based on the acquired measurement result.

Configuration of Measurement Result Management Unit

The measurement result management unit 160 includes a measurement result DB 161 that stores the measurement images included in a measurement results, the attribute information of the measurement images output from the identification device, and the results determined by the determination unit 152 in association with each other. Note that the measurement result management unit 160 may also acquire identification information for identifying the object to be inspected along with the measurement result. Here, the identification information of the object to be inspected may be acquired from the measurement unit 150, or may be acquired from the outside via a predetermined interface. Alternatively, the measurement result DB 161 classifies and stores the measurement images according to the type of attribute included in the attribute information, for example, in association with the attribute of the type of defect.

The measurement result management unit 160 outputs the measurement results to the user interface 170. Here, the measurement result management unit 160 may also output the identification information of the object to be inspected to the user interface 170. The measurement result management unit 160 outputs the measurement results also to the later-described image correction unit 120. Here, the measurement result management unit 160 may also output the identification information of the object to be inspected to the image correction unit 120.

User Interface

In one or more embodiments, the user interface 170 is used by the second operator to confirm the result determined by the determination unit 152, to perform an operation to correct an error in the determination result (correction operation), and to perform an operation to generate a composite image using the image correction unit 120 (composition or merging operation). The user interface 170 includes at least a display unit (such as a liquid crystal display apparatus) for displaying a measurement images and measurement results of the measurement unit 150, and an input unit (such as a touch panel, a keyboard, or a mouse) for allowing the second operator to perform the correction operation and the composition operation. The second operator determines whether or not the result determined by the determination unit 152 is correct based on the measurement result displayed in the display unit, and inputs information indicating whether or not the result is correct using the input unit. That is, the second operator determines whether or not the determination result is correct based on the measurement image displayed in the display unit, and the result determined by the determination unit 152 of the measurement unit 150, and inputs information indicating whether or not the determination result is correct using the input unit. When it is determined that a plurality of defects are included in the measurement image, the input unit may also receive an input indicating whether or not the determination result is correct for each of the plurality of defects.

Here, the following two patterns are envisioned as the cases where the result determined by the determination unit 152 is not correct. The first one is a case where, although the measurement image includes a defect, the result determined by the determination unit 152 indicates that there is no defect (false negative), and the second one is a case where the measurement image includes no defect, but the result determined by the determination unit 152 indicates that a defect is included (false positive). With respect to false positives, the reason why the identification device has determined that the image includes a defect is not always apparent, and therefore, it is sometimes particularly difficult to develop countermeasures by determining the type of learning data to be added in order to reduce the number of erroneous determinations.

Note that the information displayed in the display unit may include identification information of the object to be inspected, information indicating the position of a defect on a measurement image, and an image in which a partial image based on which the determination unit 152 has made its determination is emphasized. The image in which a partial image based on which the determination has been made is emphasized may be generated based on position information or a degree of contribution of a partial image based on which the determination unit 152 has made its determination, that is, a partial image that greatly influences the determination result, and may be generated by indicating which part of the image the identification device has focused on in order to perform the identification using a CAM (Class Activation Map), which is a known method, for example.

The details of the correction operation performed by the second operator are output to the image correction unit 120. Here, the details of the correction operation may include the measurement image, which was the target of the correction operation, and information indicating whether or not the result determined by the determination unit 152 is correct. Note that the details of the correction operation may also be information indicating that the correction operation is not necessary. Also, the details of the correction operation may also include, when the determination result is not correct, different information depending on whether the erroneous determination is a false negative type or a false positive type. For example, in the case of a false negative erroneous determination, the details of the correction operation may include information indicating the position and type of the defect. Here, as a result of prompting, using the user interface 170, the second operator to perform correction operation to designate the position of the defect, information indicating the position of the defect can be collected as the correction result. Note that the first operator and the second operator may be the same.

Configuration of Image Correction Unit

The image correction unit 120 generates learning data based on information indicating whether or not the result determined by the determination unit 152 is correct. The image correction unit 120 includes the generation unit 121, the corrected image database (hereinafter, referred to as a "corrected image DB") 122, the extraction unit 123, a verification unit 124, and a communication unit 125, and generates learning data based on a measurement image for which a false positive erroneous determination has been made in accordance with a correction operation and a composition operation that have been received from the user interface 170.

The extraction unit 123 extracts a partial image of the measurement image based on which the determination unit 152 has made its determination. The partial image of an image based on which the determination has been made includes a portion of the image that has exerted a relatively large influence on the determination of the identification device. When the identification device is constituted by a CNN, the extraction unit 123 extracts pixels whose degree of contribution to the result determined by the identification device is a predetermined value or more, inside the region of an image subject to an erroneous determination, for example. The extraction unit 123 may extract a partial image based on a CAM obtained when the measurement image is identified by the identification device, for example. If it is determined that the measurement image includes a plurality of defects, then for one of the defects, regarding which an input is made indicating that the determination result is not correct, the extraction unit 123 may extract a partial image of the measurement image based on which the determination has been made. For example, in the CAM, depending on the structure of the CNN, weights for output classes may be acquired from the result of learning processing, with respect to each node of a convolutional layer corresponding to the determination results, the output of the nodes may be multiplied by the weight corresponding to the class of the determination result, responses to the classes of the determination results with respect to the input may be mapped, and as a result, the degree of contribution to the determination result may be calculated. Note that the extraction unit 123 may also be provided in the measurement unit 150.

When an input indicating that the result determined by the determination unit 152 is not correct has been entered into the input unit of the user interface 170, the generation unit 121 generates new learning data based on a partial image extracted by the extraction unit 123. When the determination unit 152 determines that the measurement image includes a defect, and an input has been made indicating that the result determined by the determination unit 152 is not correct using the input unit, the generation unit 121 may generate new learning data in which information indicating that at least the partial image does not include a defect is associated with the measurement image. Also, when the determination unit 152 determines that the image includes a defect, and an input has been made indicating that the result determined by the determination unit 152 is not correct using the input unit, the generation unit 121 generates a composite image in which the partial image and an image of the object to be inspected that does not include a defect are combined, and may generate new learning data in which the composite image is associated with information indicating that no defect is included. Also, if it is determined that the measurement image includes a plurality of defects, the generation unit 121 may generate new learning data based on the partial image for each of the plurality of defects.

Note that the image correction unit 120 may be configured such that, authority to execute a correction operation and a composition operation is given to an operator, and only a correction operation and/or a composition operation performed by the operator having the execution authority (authorized person) is accepted. Accordingly, the reliability of the correction operation and/or the composition operation is improved, and the quality of newly created learning data and the identification accuracy of an identification device that is created using the new learning data can be improved.

If the determination unit 152 has determined that an image that does not actually include a defect includes a plurality of defects, then, as a result of generating new learning data based on a partial image based on which the determination has been made, even if the reason why it has been determined that the image includes defects is not apparent, an image similar to the image subject to an erroneous determination is generated for each of the plurality of defects, and learning data with which the number of erroneous determinations can be reduced can be generated. Accordingly, it is not necessary to consume computation resources to analyze causes for erroneous determination by the identification device, and an identification device having a high determination accuracy can be generated with a small computation amount. Specifically, in a situation in which new learning data is generated based on a measurement image, there are cases where an operator having little knowledge about machine learning performs operations to generate learning data. Even in these cases, according to one or more embodiments, new learning data that corresponds to a defect of the object to be inspected that is generated in each processing step can be easily generated. As a result of generating an identification device that has been trained using the new learning data, an identification device appropriate for each processing step can be generated, and therefore the identification accuracy can be improved.

The generation unit 121 may generate a composite image by combining a partial image including a defect that has been extracted by the extraction unit 123 and a sample image that includes or does not include a defect, based on a predetermined combination rule, for example. The sample image is an image that is different from the original measurement image from which the partial image has been extracted. A known method can be used as the predetermined combination rule. For example, a method such as Poisson image editing with which a boundary of the composition is unlikely to be erroneously detected as another defect can be used. Also, the generation unit 121 may generate a composite image by combining a partial image including a defect and a sample image that includes a defect whose position can be correctly determined by the determination unit 152, based on a predetermined combination rule. Also, the generation unit 121 may extend (augment) the composite image.

The corrected image DB 122 stores new learning data generated by the generation unit 121. The corrected image DB 122 may store partial images extracted by the extraction unit 123.

The verification unit 124 causes the determination unit 152 to determine whether or not the composite image includes a defect, and verifies whether a determination result will be obtained that is similar to the determination result obtained when the determination unit 152 has determined whether or not the measurement image based on which the composite image has been generated includes a defect. Here, the verification unit 124 preferably uses an identification device that is the same as the identification device that has determined whether or not the measurement image includes a defect to determine whether or not the composite image includes a defect. With this, it can be verified if a composite image has been generated with which a determination result can be obtained that is similar to the determination result obtained with the original image that does not actually include a defect, but with which the determination unit 152 erroneously determines that a defect is included. Therefore, it can be confirmed that the generated composite image is useful for reducing the number of erroneous determinations, and the variation of image data with which the identification device may perform false positive detections (erroneous detections) can be increased.

Note that a "similar determination result" is, for example, a determination result that is obtained when, if the determination unit 152 is caused to determine whether or not the composite image includes a defect, the determination unit 152 erroneously determines that a defect is included, just like for the image from which the partial image has been extracted (that is, a measurement image of the object to be inspected). Here, it is preferable that the region in the measurement image in which a defect is erroneously determined to be present, that is, a first region of the measurement image from which the partial image has been extracted, matches a second region of the composite image in which a defect is erroneously determined to be present when it has been erroneously determined that the composite image obtained by combining the partial image based on a predetermined condition includes the defect, that is, the region where the partial image is combined. Here, when a composite image is generated based on a partial image, there is a predetermined condition such as that the shape of the partial image is changed, or that there is a pattern that is caused by a texture in a background image to which an image is to be combined. Therefore, the first region need not completely match the second region, and the region indicated by the extracted partial image needs only match the partial image that has been combined while the predetermined condition is taken into consideration.

The communication unit 125 may inquire of an authorized person whether or not, when new learning data is to be generated by the generation unit 121, the new learning data is to be registered. Here, the authorized person is a person having an authority to correct the determination by the second operator, and is a person having an authority to manage the generation of the learning data. As a result of inquiring of the authorized person, when new learning data is generated, whether or not the new learning data is to be registered, the new learning data is prevented from being easily registered, and learning data having an appropriate content can be accumulated. Note that the communication unit 125 may also be the user interfaces (170 and 180) and a connection unit, and may output information to a device external to the inspection apparatus 100 by wire or wirelessly.

Also, the image correction unit 120 may accept an input of a cause of erroneous determination results by the determination unit 152 from the second operator with an input unit of the user interface 170. The generation unit 121 provided in the image correction unit 120 selects an image (sample image) that is different from the image from which the partial image has been extracted based on the cause. Next, the image correction unit 120 generates a composite image in which the partial image and the selected sample image are combined. The cause of an erroneous determination by the determination unit 152 need not be definitive, and may be obtained by estimation. The cause of an erroneous determination may be, for example, a certain uniform texture pattern that appears as a result of hairline processing or the like being performed on an object to be inspected, or a logo added to the object to be inspected or an edge of the object to be inspected being included in the measurement image, and may be a cause due to a feature of an external surface of the object to be inspected.

Also, the image correction unit 120 may display data for calling attention to a possible defect in the process of capturing images of the object to be inspected in the display unit of the user interface 170, based on the cause that has been input. Here, the defect in the image capturing process that induces an erroneous determination by the determination unit 152 is a defect relating to the image capturing conditions when an image of the object to be inspected is captured, for example. For example, when it is estimated that the cause of erroneous determination by the determination unit 152 is in the image capturing process such as a case where, although images of the object to be inspected should be captured such that a logo added to the object to be inspected and an edge of the object to be inspected should not be included in the measurement image, the measurement image includes a logo added to the object to be inspected or an edge of the object to be inspected due to a defect in the production line, data for calling attention to a possible defect in the process of capturing images of the object to be inspected is output. As a result, a warning of a defect in the image capturing process can be given, and the number of erroneous determinations to be made by the determination unit 152 can be reduced. Also, a defect in the process of capturing images of the object to be inspected can be found in an early stage, and the reliability in inspecting the object to be inspected can be improved.

The image correction unit 120 may display the measurement image and an image in which the partial image has been emphasized in the display unit of the user interface 170 such that these images can be compared to each other. With this, the second operator can visually recognize a part of an image based on which the determination unit 152 has determined that the image includes a defect. As a result of comparing the original image with the image in which the partial image has been emphasized, it can be easily verified whether the determination unit 152 correctly determined that an image that actually includes a defect includes a defect, or the determination unit 152 erroneously determined that an image that does not actually include a defect includes a defect. Here, the display unit may display an image and an image in which a partial image has been emphasized in a superimposed manner, or may display an image and identification information of the object to be inspected. Specific exemplary displays of these will be described later in detail using diagrams.

Hardware Configuration

Figure 4:
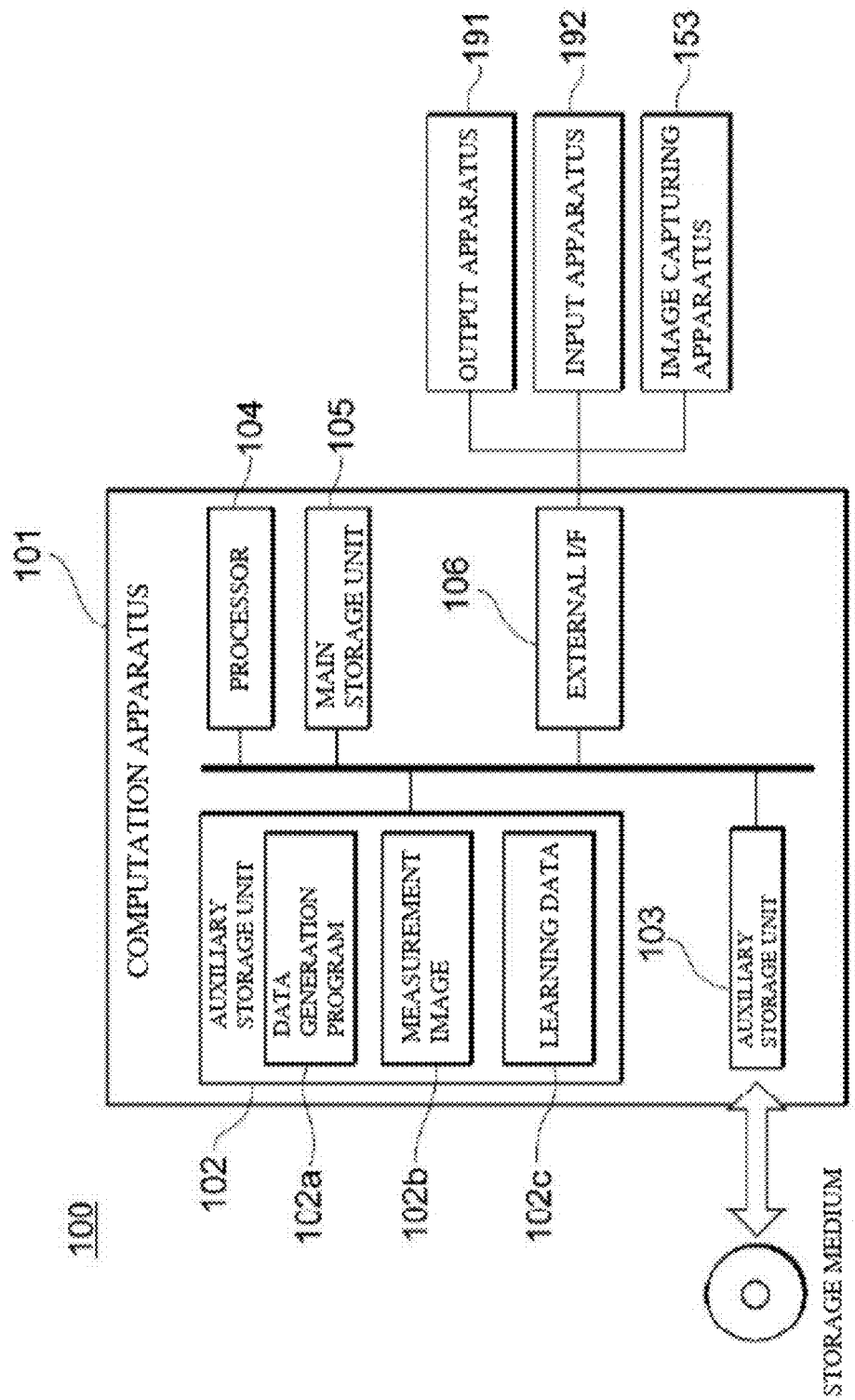
FIG. 4 is a block diagram illustrating a hardware configuration of an inspection apparatus according to one or more embodiments.

Next, an example of the hardware configuration of the inspection apparatus 100 according to one or more embodiments will be described using FIG. 4. The inspection apparatus 100 according to one or more embodiments may be an information processing apparatus that includes a computation apparatus 101, an output apparatus 191, an input apparatus 192, and the image capturing apparatus 153. Here, the output apparatus 191 and the input apparatus 192 constitute the user interface 170 and the user interface 180.

The computation apparatus 101 may also include the auxiliary storage units 102 and 103, the processor 104, a main storage unit 105, and an external interface (hereinafter, referred to as an "external I/F").

The computation apparatus 101 includes a CPU (Central Processing Unit), a RAM (Random Access Memory), a ROM (Read Only Memory), and the like, and controls the constituent elements according to information processing. The processor 104 may include a CPU, and the auxiliary storage units 102 and 103 and the main storage unit 105 may each include a RAM and a ROM. The auxiliary storage unit 102 may be a hard disk drive, a solid-state drive, or the like, and may store a data generation program 102a to be executed by the processor 104, a measurement image 102b captured by the image capturing apparatus 153, learning data 102c, and the like. The auxiliary storage unit 103 and the main storage unit 105 may be a hard disk drive or a solid-state drive, for example, similarly to the auxiliary storage unit 102. The data generation program 102a is a program for performing processing for realizing functions of the image collection unit 110, the image correction unit 120, the first learning unit 130, the second learning unit 140, the measurement unit 150, and the measurement result management unit 160 that have been described above, and the functions are realized by the program being executed by the processor 104. Note that the data generation program 102a may also be a program for performing processing for realizing some of functions of the image collection unit 110, the image correction unit 120, the first learning unit 130, the second learning unit 140, the measurement unit 150, and the measurement result management unit 160, and may also include a program for performing processing for realizing other functions.

The external I/F 106 is a USB (Universal Serial Bus) port or the like, and is an interface for connecting to external apparatuses such as the output apparatus 191, the input apparatus 192, and the image capturing apparatus 153. Note that the inspection apparatus may also include an interface for performing wired or wireless communication via a network, such as a wired LAN (Local Area Network) module or a wireless LAN module.

A storage medium is a medium that stores information such as programs and the like via an electrical, magnetic, optical, mechanical or chemical effect such that the stored information such as programs can be read by an apparatus such as a computer. The storage medium may be a CD (Compact Disk) or a DVD (Digital Versatile Disk), for example, and may store the data generation program 102a. The data generation program 102a stored in the storage medium is copied to the auxiliary storage unit 103, and may also be copied to the auxiliary storage unit 102 and the main storage unit 105. In FIG. 4, a disk-type storage medium such as a CD or a DVD is illustrated as an example of the storage medium. However, the type of the storage medium is not limited to the disk type, and may be a type other than the disk type. A semiconductor memory such as a flash memory can be given as an example of a storage medium other than a disk-type storage medium. Also, the inspection apparatus 100 may acquire data such as the data generation program 102a using wired or wireless communication via a network.

Note that, in relation to the specific hardware configuration of the inspection apparatus 100, constituent elements can be omitted, substituted and added as appropriate depending on an embodiment. For example, the computation apparatus 101 may include a plurality of processors, or may include a GPU (Graphical Processing Unit) or an FPGA (Field Programmable Gate Array). Also, the inspection apparatus 100 may also be constituted by a plurality of information processing apparatuses. The inspection apparatus 100 may be constituted also by, other than an information processing apparatus designed only for the service that is provided, a general-purpose desk top PC (Personal Computer), a tablet PC, or the like.

3. Exemplary Operations

Figure 5:
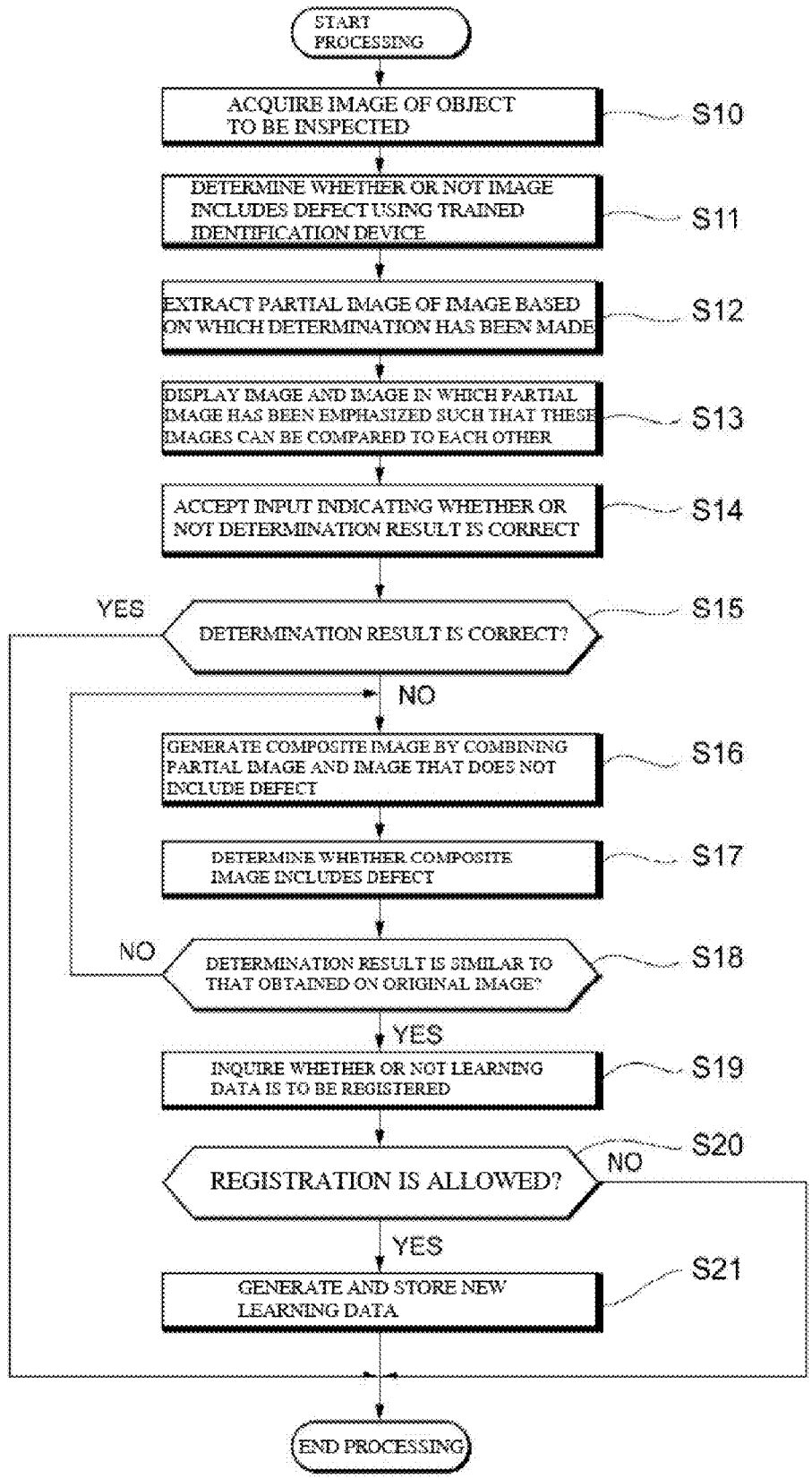
FIG. 5 is a flowchart illustrating first processing to be executed by an inspection apparatus according to one or more embodiments.

FIG. 5 is a flowchart illustrating first processing to be executed by the inspection apparatus 100 according to one or more embodiments. The first processing is processing in which whether or not the object to be inspected includes a defect is determined using a trained identification device based on a measurement image, the measurement image and an image in which the partial image based on which the determination has been made has been emphasized are displayed side by side for enabling comparison, and if an input indicating that the determination result is not correct is received, a composite image is generated and new learning data is generated.

The inspection apparatus 100 acquires a measurement image of the object to be inspected (S10), and determines whether or not the measurement image includes a defect using an identification device that has been trained by the first learning unit 130 and the second learning unit 140 (S11). Note that, if it has been determined that the object to be inspected includes a defect, based on the measurement image, position information that indicates a region on the measurement image that has been identified as a defect may be added to the determination result. Also, the extraction unit 123 extracts a partial image of the image based on which the determination has been made (S12).

The inspection apparatus 100 displays the measurement image and an image in which the partial image has been emphasized side by side to enable comparison in the display unit of the user interface 170 (S13). Accordingly, material based on which the second operator can determine whether or not the determination result is correct is provided.

The inspection apparatus 100 accepts an input indicating whether or not the determination result is correct that has been input using the input unit of the user interface 170 (S14). If the input indicates that the determination result is correct (S15: YES), the first processing is ended. On the other hand, if the determination unit 152 determined that the image includes a defect, and an input indicating that the result determined by the determination unit 152 is not correct is made using the input unit (S15: NO), that is, in the case of a false positive (erroneous detection), the generation unit 121 generates a composite image by combining the partial image and a sample image that does not include a defect (S16).

The verification unit 124 causes the determination unit 152 to determine whether or not the composite image includes a defect (S17), and verifies whether or not a determination result is obtained that is similar to that when the determination unit 152 has determined whether or not the image, based on which the composite image is generated, includes a defect. That is, it is verified, when the determination unit 152 is caused to determine whether or not the composite image includes a defect, whether or not the determination unit 152 erroneously determines that a defect is included, just like with the measurement image based on which the composite image is generated. If a determination result similar to that obtained on the measurement image, based on which the composite image is generated, is not obtained (S18: NO), the generation unit 121 modifies composition parameters for generating the composite image, and again generates a composite image.

On the other hand, if a determination result similar to that obtained on the measurement image, based on which the composite image is generated, is obtained (S18: YES), the communication unit 125 inquires of the authorized person whether or not image data with which similar determination result has been obtained may be registered as new learning data (S19). Here, the communication unit 125 may transmit data based on which the authorized person can make determination, such as the measurement image based on which composition has been made, an image in which the partial image has been emphasized, and the composite image.

If the authorized person determines that the image data can be registered as new learning data (S20: YES), the generation unit 121 generates new learning data in which the composite image is associated with information indicating that no defect is included, and stores the new learning data to the corrected image DB 122 (S21). On the other hand, if the authorized person determines that the image data is not allowed to be registered as new learning data (S20: NO), the processing is ended without registering the learning data. Then, the first processing is ended.

Note that, if a determination result similar to that made with the measurement image based on which composition has been made is obtained, the image data may be registered as new learning data without making an inquiry to the authorized person.

According to the inspection apparatus 100 according to one or more embodiments, as a result of generating a composite image by combining a partial image based on which the determination unit 152 has made the determination that a defect is included with an image that does not include a defect, the variation of images with which, although no defect is included, the determination unit 152 erroneously determines that a defect is included can be increased. Accordingly, an image similar to the image for which an erroneous determination that a defect is included has been made is generated, and learning data with which the number of erroneous determinations can be reduced can be generated. As a result of increasing the variation of images with which erroneous determinations are made, the states of the object to be inspected with which erroneous determinations are made need not be reproduced, and the photographing environment need not be reproduced, and therefore, an identification device having high determination accuracy can be generated with fewer facilities.

Figure 6:
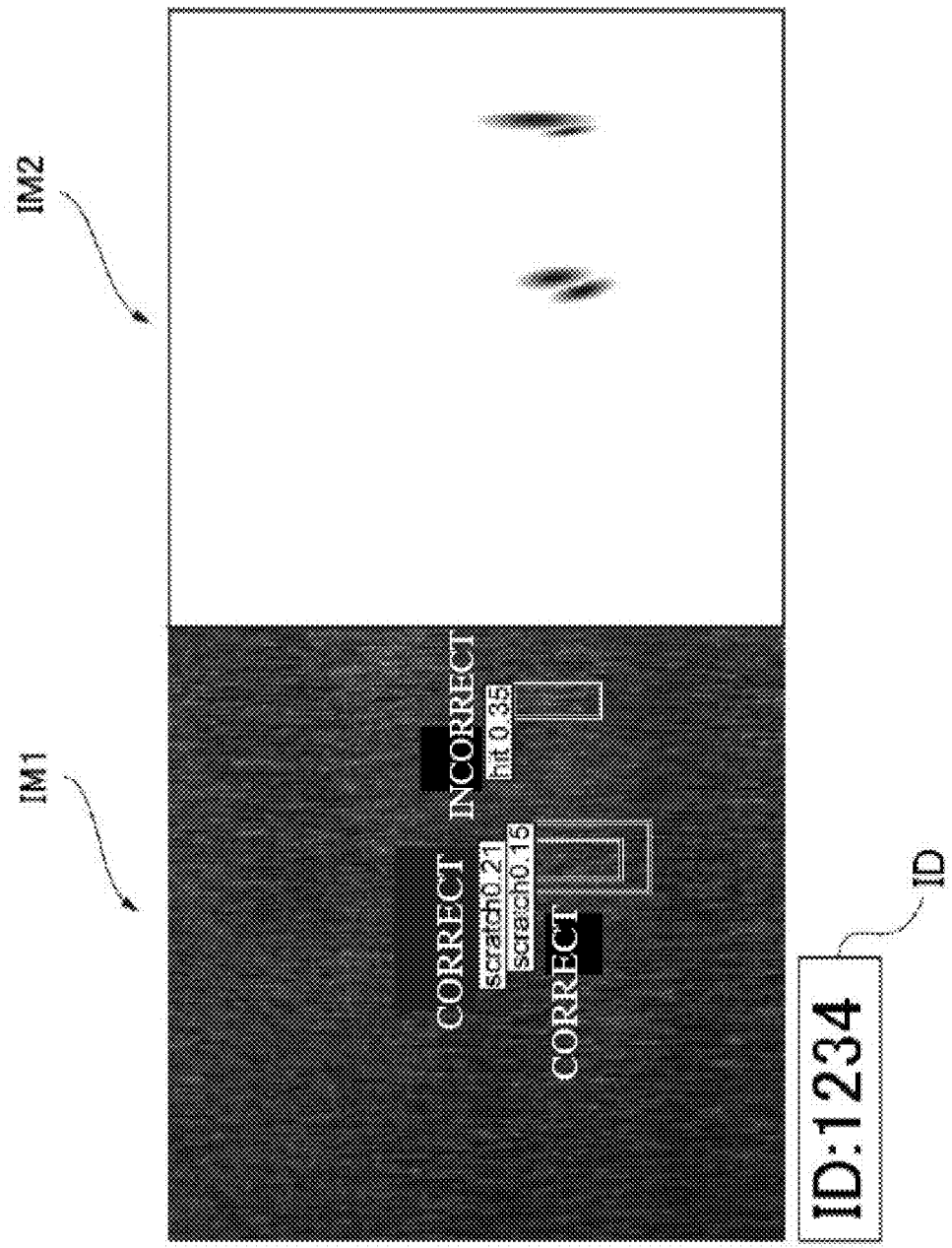
FIG. 6 is a diagram illustrating an example of an image of an object to be inspected that is displayed by an inspection apparatus according to one or more embodiments, and an image in which a partial image is emphasized.

FIG. 6 is a diagram illustrating an example of a measurement image IM1 of the object to be inspected, and an image IM2 that is obtained by the extraction unit 123 emphasizing a partial image based on which the determination unit 152 has made its determination, which are displayed by the inspection apparatus 100 according to one or more embodiments. Note that, in the image IM1, information indicating correct/incorrect is given to each determination result, the information being obtained as a result of accepting an input indicating whether or not the determination result is correct, for each of a plurality of determination positions. Here, the image IM2 in which a partial image has been emphasized is an image generated using the CAM.

In the measurement image IM1 of the object to be inspected, defects determined by the determination unit 152, three frames that indicate regions determined to include the defects (position information), types of defects determined by the determination unit 152, and numerical values indicating the degree of reliability of the determination by the determination unit 152 are displayed as the determination results. Also, in the measurement image IM1, for the defects indicated by the three frames, input results are included that indicate whether or not the determination results are correct that have been input by the second operator via the input unit. In this example, the determination unit 152 has determined that the measurement image IM1 of the object to be inspected includes three defects. "scratch0.21" and "scratch0.15" are respectively added to the two defects located on the left side, which shows that the determination unit 152 has determined that the type of the defects is a "scratch", and the numerical values indicating the reliability are respectively 0.21 and 0.15. Also, "hit0.35" is added to the defect located on the right side of the measurement image IM1 of the object to be inspected, which shows that the determination unit 152 has determined that the type of the defect is a "hit" and the numerical value indicating the reliability is 0.35. The two defects located on the left side, of the regions determined to each include a defect by the determination unit 152, are confirmed to be actual defects by the second operator, and are given text "correct" indicating that the determination result is correct. On the other hand, the region located on the right side of the measurement image IM1 of the object to be inspected does not actually include a defect, but it is erroneously determined by the determination unit 152 that this region includes a defect. It is confirmed that the region does not include a defect by the second operator, and the text "incorrect" indicating that the determination result is incorrect is given to this defect.

Also, the image IM2 in which a partial image is emphasized is an image in which regions of the measurement image based on which the identification device has made its determination that a defect is included are displayed in a graded manner according to the contribution level to the determination. Specifically, the regions are displayed in a graded manner such that, in units of one or more pixels, the density of pixels increases as the contribution level to the determination increases. As a result of displaying such an image so as to allow comparison with an original measurement image, the region of the measurement image based on which the identification device has made the determination that a defect is included can be easily verified. With this, the determination whether or not the result determined by the determination unit 152 is correct can be made quickly, and the flow of the production line can be made smooth.

In this example, an identification information ID of the object to be inspected is displayed below the measurement image IM1 of the object to be inspected. The identification information ID is "ID: 1234", and the object to be inspected can be specified by this identification information ID. The identification information may be information for identifying a lot indicating a set of a plurality of objects to be inspected, or may be individual identification information for specifying an individual object to be inspected, for example. As a result of displaying the identification information ID of the object to be inspected, the operator can easily associate the object to be inspected itself with the measurement image and the determination result. Accordingly, the operator can easily obtain the object to be inspected, and can visually verify whether or not the object to be inspected includes a defect or keep the object to be inspected as a sample.

Figure 7:
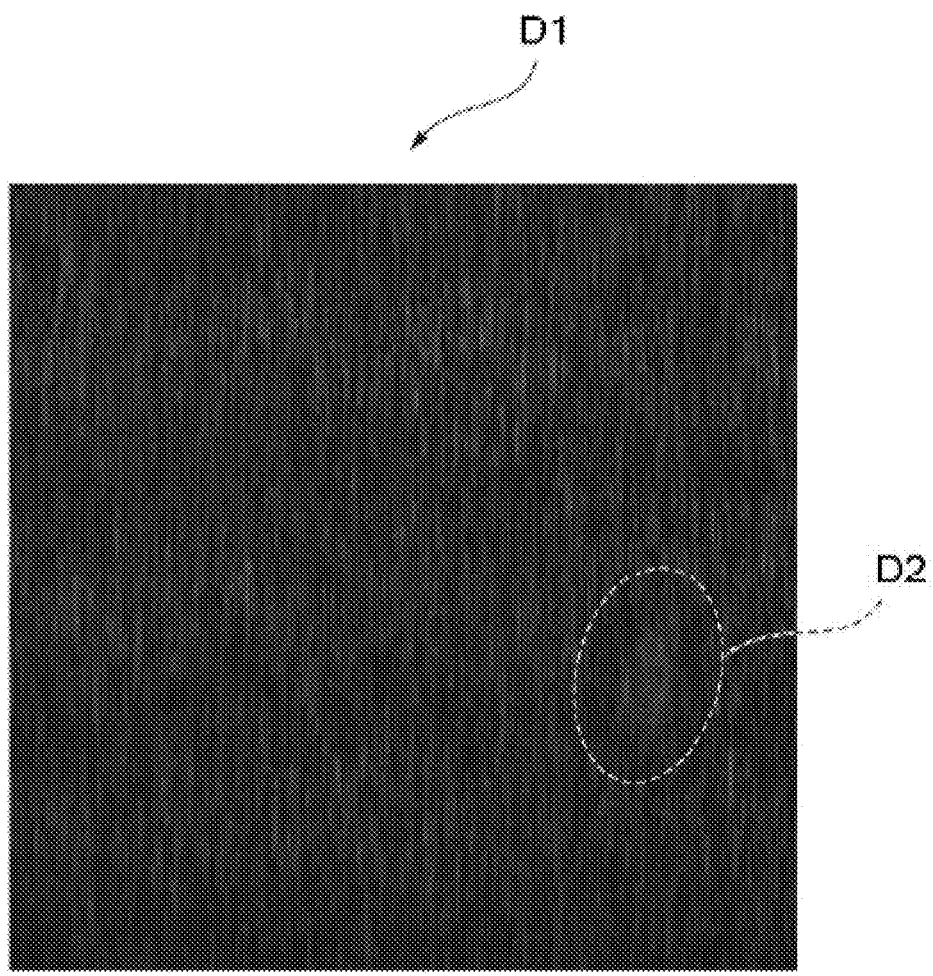
FIG. 7 is a diagram illustrating an example of a composite image generated by an inspection apparatus according to one or more embodiments.

FIG. 7 is a diagram illustrating an example of a composite image D1 generated by the inspection apparatus 100 according to one or more embodiments. The composite image D1 is an image in which a sample image that does not include a defect and a partial image extracted from a measurement image that has been erroneously determined to include a defect are combined. Here, the region in which a partial image D2 is included is indicated by a broken line.

The composite image D1 is an image that looks like it does not include a defect in a visual check and that is erroneously determined to include a defect by the determination unit 152 but the cause of this erroneously determination is not obvious. When the determination unit 152 makes a false positive erroneous determination, it is not always apparent why the determination unit 152 has determined that the image includes a defect, and there are cases where it is difficult to plan a countermeasure to reduce the number of erroneous determinations by determining the type of learning data to be added. According to the inspection apparatus 100 according to one or more embodiments, as a result of generating new learning data that includes such a composite image D1 that has been generated, and in which information indicating that the region of the partial image D2 does not include a defect is associated with the composite image D1, the variation of images with which false positive erroneous determination might be made can be increased. That is, new learning data that is likely to lead to the erroneous determination that a defect is included (likely to lead to a false positive) is generated, and training can be performed using this learning data, and as a result, the accuracy of the identification device can be improved.

Also, the inspection apparatus 100 may display, in the display unit of the user interface 170, the measurement image and an image that was determined to include a defect by the determination unit 152 in the past, or an image that was determined to not include a defect by the determination unit 152 in the past. With this, the current image can be compared with past examples of images that were determined to include a defect by the determination unit 152, or past examples of images that were determined to not include a defect by the determination unit 152, and as a result, material based on which determining whether or not the result determined by the determination unit 152 is correct can be provided. Accordingly, the determination whether or not the result determined by the determination unit 152 is correct can be made quickly, and the flow of the production line can be made smooth.

Figure 8:
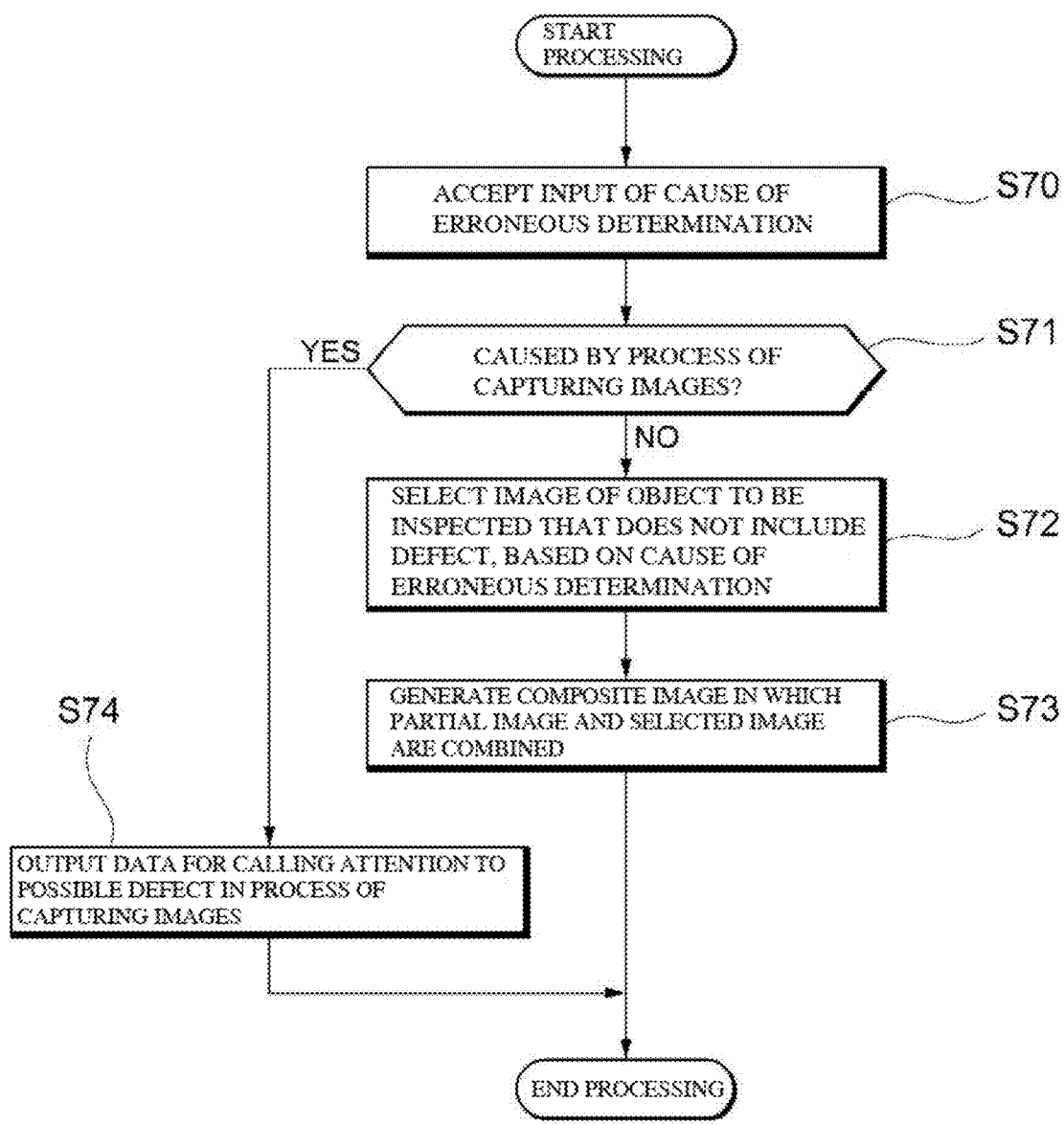
FIG. 8 is a flowchart illustrating second processing to be executed by an inspection apparatus according to one or more embodiments.

FIG. 8 is a flowchart illustrating second processing to be executed by the inspection apparatus 100 according to one or more embodiments. The second processing is processing in which input of a cause of erroneous determination by the determination unit 152 is accepted, and data for calling attention to a possible defect in the process of capturing images of the object to be inspected is output, or a composite image using an image selected based on that cause is generated. The second processing can be used when, as a result of accepting an input of the cause when an input indicating whether or not the result determined by the determination unit 152 is correct is made in the first processing described above, determining a principle of image composition, or pointing out a defect in the image capturing condition, for example. Here, examples of causes include causes that are due to a feature of an external surface of the object to be inspected, and causes due to the condition of capturing an image of the object to be inspected.

The inspection apparatus 100 accepts a cause of erroneous determination by the determination unit 152 with the input unit of the user interface 170 (S70). Here, the cause may be input by selecting one or more of a plurality of causes anticipated in advance, or by free description.

The inspection apparatus 100 determines whether or not the cause that was input is due to a process of capturing an image of the object to be inspected (S71). For example, when a fact that a logo added to the object to be inspected or an edge of the object to be inspected is included in the measurement image is input as a cause of erroneous determination, the cause that was input may be determined as being caused in the process of capturing images of the object to be inspected.

If the cause that was input is determined not to be due to the process of capturing images of the object to be inspected (S71: NO), the generation unit 121 selects an image of the object to be inspected that does not include a defect, based on the cause (S72). For example, when a fact that hairline processing is applied to the object to be inspected and a hairline pattern is likely to be identified as a defect is input as the cause of erroneous determination, the generation unit 121 selects a sample image whose hairline direction is the same as that of the measurement image. Then, the generation unit 121 generates a composite image in which the partial image and the selected sample image are combined (S73). With this, when the cause of erroneous determination by the determination unit 152 can be anticipated, a composite image for which a similar erroneous determination might be made based on the same cause can be generated, and therefore, an image similar to the image that was erroneously determined to include a defect can be generated, and learning data with which the number of erroneous determinations can be reduced can be generated.

On the other hand, if the cause that has been input is determined to be caused in the process of capturing images of the object to be inspected (S71: YES), data for calling attention to a possible defect in the process of capturing images of the object to be inspected is output based on the cause (S74). Then, the second processing is ended.

4. Modifications 4.1

Figure 9:
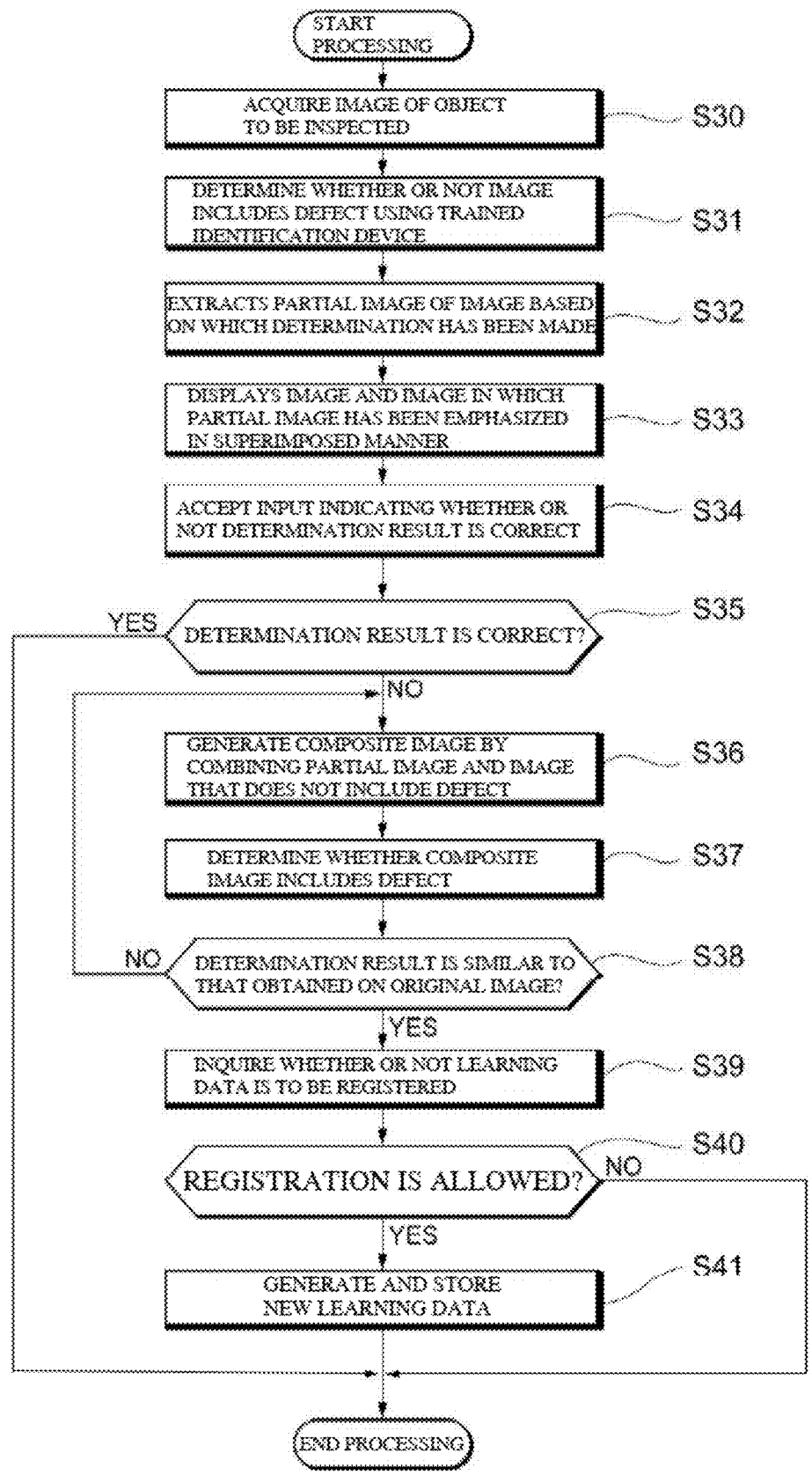
FIG. 9 is a flowchart illustrating third processing to be executed by an inspection apparatus according to a first modification of one or more embodiments.

FIG. 9 is a flowchart illustrating third processing to be executed by the inspection apparatus 100 according to a first modification of one or more embodiments. The third processing is processing in which a trained identification device determines whether a measurement image of the object to be inspected includes a defect, the measurement image and an image in which a partial image based on which the determination has been made has been emphasized are displayed in a superimposed manner such that they can be compared, and if an input indicating that the determination result is not correct is made, a composite image is generated, and new learning data is generated.

The inspection apparatus 100 acquires a measurement image of the object to be inspected (S30), and determines whether or not the measurement image includes a defect using an identification device trained by the first learning unit 130 and the second learning unit 140 (S31). Then, the extraction unit 123 extracts a partial image of the image based on which the determination has been made (S32).

The inspection apparatus 100 displays the measurement image and the image in which the partial image has been emphasized, in the display unit of the user interface 170, in a superimposed manner such that they can be compared (S33). With this, the second operator can be provided with material based on which whether or not the determination result is correct is determined.

The inspection apparatus 100 accepts an input indicating whether or not the determination result is correct that has been made using the input unit of the user interface 170 (S34). If an input indicating that the determination result is correct is accepted (S35: YES), the third processing is ended. On the other hand, if the determination unit 152 determines that the image includes a defect, and an input indicating that the result determined by the determination unit 152 is not correct is made using the input unit (S35: NO), the generation unit 121 generates a composite image in which the partial image and a sample image in which no defect is included are combined (S36).

The verification unit 124 causes the determination unit 152 to determine whether or not the composite image includes a defect (S37), and verifies whether or not a determination result similar to that obtained when the determination unit 152 is caused to determine whether or not the image based on which the composite image has been generated includes a defect can be obtained. That is, it is verified whether or not, when the determination unit 152 is caused to determine whether or not the composite image includes a defect, the determination unit 152 erroneously determines that a defect is included, similarly to the measurement image based on which the combined image has been generated. If a determination result similar to that made with the measurement image based on which the composite image has been generated is not obtained (S38: NO), the generation unit 121 modifies the composition parameters for generating the composite image, and again generates a composite image.

On the other hand, if a determination result similar to that obtained on the measurement image, based on which the composite image is generated, is obtained (S38: YES), the communication unit 125 inquires of the authorized person whether or not image data with which similar determination result has been obtained may be registered as new learning data (S39). Here, the communication unit 125 may transmit data which serves as material based on which the authorized person makes the determination, such as the measurement image based on which composition has been made, an image in which the partial image has been emphasized, and the composite image.

If the authorized person determines that the image data can be registered as new learning data (S40: YES), the generation unit 121 generates new learning data in which the composite image is associated with information indicating that no defect is included, and stores the new learning data in the corrected image DB 122 (S41). On the other hand, if the authorized person determines that the image data is not allowed to be registered as new learning data (S40: NO), the processing is ended without registering the learning data. Then, the third processing is ended.

Figure 10:
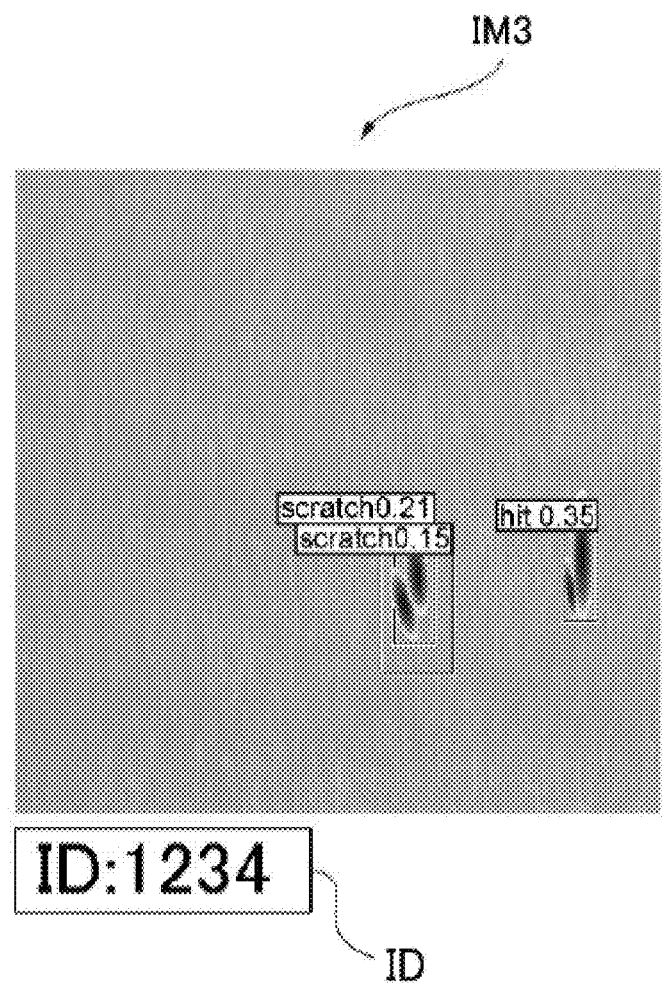
FIG. 10 is a diagram illustrating an example in which an image in which a partial image is emphasized is displayed so as to be superimposed with an image of an object to be inspected, by an inspection apparatus according to a first modification of one or more embodiments.

FIG. 10 is a diagram illustrating an example in which an image of the object to be inspected and an image in which a partial image is emphasized are displayed in a superimposed manner by the inspection apparatus 100 according to a first modification of one or more embodiments. In FIG. 10, an example of a superimposed image IM3 is illustrated in which the image IM2 in which a partial image is emphasized is subjected to transparency processing is superimposed with the measurement image IM1 of the object to be inspected shown in FIG. 6. As a result of displaying such a superimposed image IM3 as well, the region of the measurement image based on which the identification device has determined that a defect is included can be easily confirmed. Also, the determination whether or not the result determined by the determination unit 152 is correct can be made quickly, and the flow of the production line can be made smooth.

Note that the input unit of the user interface 170 may accept, from the second operator, an input for switching between displaying only the measurement image IM1 of the object to be inspected without the image IM2 in which a partial image has been emphasized being not superimposed and displaying the superimposed image IM3. Also, the input unit of the user interface 170 may accept, from the second operator, an input for changing the transparency rate of the image IM2 in which a partial image has been emphasized.

In this example as well, an identification information ID of the object to be inspected is displayed below the superimposed image IM3. The identification information ID is "ID: 1234", and the object to be inspected can be specified by this identification information ID. The identification information may be information for identifying a lot of a plurality of objects to be inspected, or may be individual identification information for specifying an individual object to be inspected, for example. As a result of displaying the identification information ID of the object to be inspected, the operator can easily associate the object to be inspected itself with the measurement image and the determination result. Accordingly, the operator can easily obtain the object to be inspected, and can visually verify whether or not the object to be inspected includes a defect or keep the object to be inspected as a sample.

According to the inspection apparatus 100 according to one or more embodiments, as a result of displaying an image in which a partial image has been emphasized and an original image in a superimposed manner, the region of the image based on which the determination unit 152 has made its determination can be precisely compared with the original image. It can be easily verified whether the determination unit 152 has correctly determined that an image actually including a defect includes a defect, or the determination unit 152 has erroneously determined that an image that does not actually include a defect includes a defect.

The inspection apparatus 100 may display, in the display unit of the user interface 170, a measurement image and an image of the object to be inspected that includes a defect and was acquired in the past, or an image of the object to be inspected that does not include a defect and was acquired in the past. With this, the current image can be compared with a past example of the image that includes a defect or a past example of the image that does not include a defect, and as a result, material based on which whether or not the result determined by the determination unit 152 is correct can be determined can be provided. Accordingly, the determination whether or not the result determined by the determination unit 152 is correct can be made quickly, and the flow of the production line can be made smooth.

4.2

Figure 11:
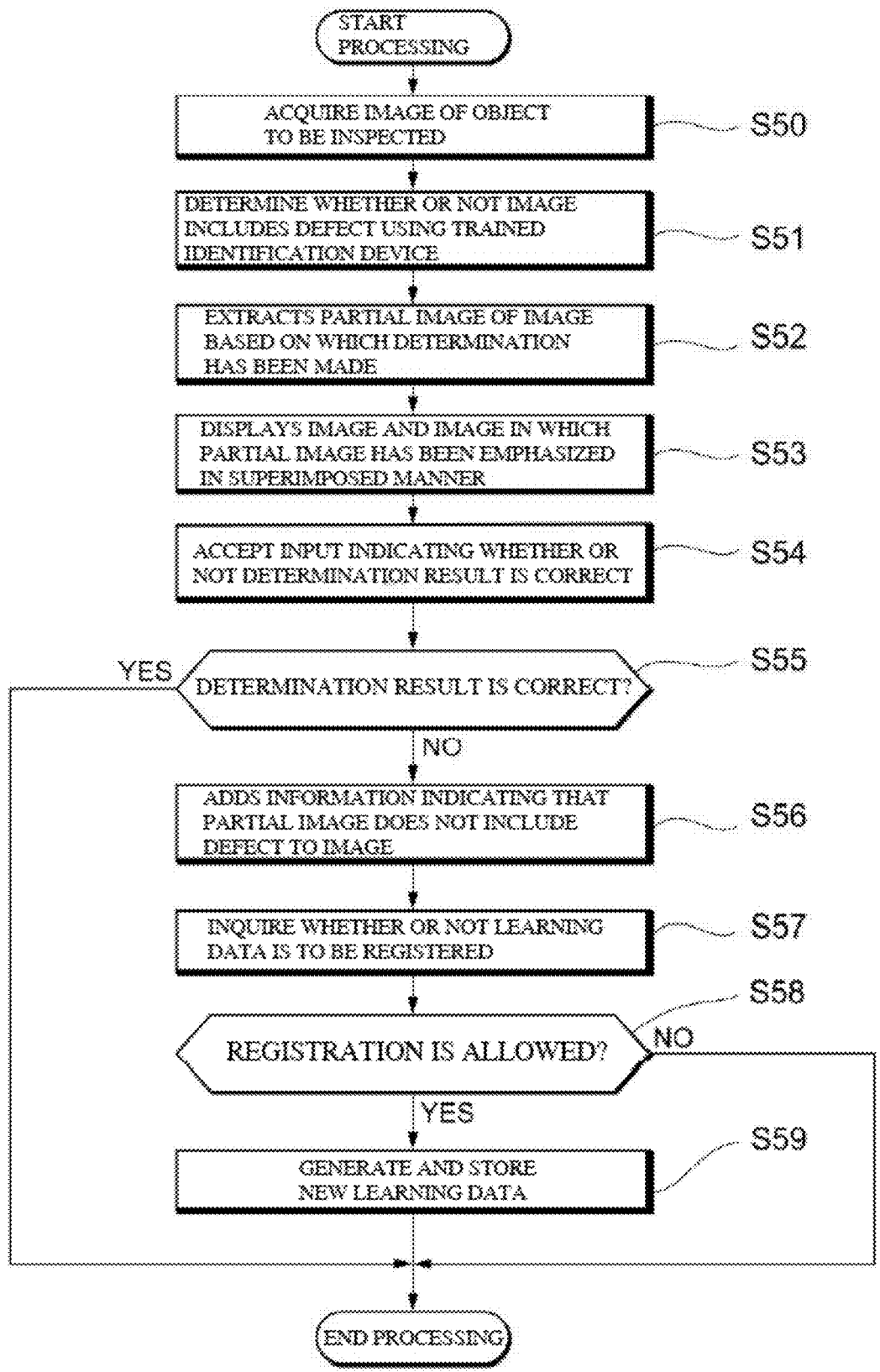
FIG. 11 is a flowchart illustrating fourth processing to be executed by an inspection apparatus according to a second modification of one or more embodiments.

FIG. 11 is a flowchart illustrating fourth processing to be executed by an inspection apparatus 100 according to a second modification of one or more embodiments. The fourth processing is processing in which a trained identification device determines whether or not a measurement image of the object to be inspected includes a defect, the measurement image and an image in which a partial image based on which the determination has been made has been emphasized are displayed in a superimposed manner such that they can be compared, and if the fact that the determination result is not correct is input, new learning data is generated by adding information indicating that the partial image does not include a defect to the measurement image. Note that the fourth processing may be executed in parallel with the first processing or the third processing. That is, in addition to the first processing and the third processing in which a composite image is generated and is used as learning data, the fourth processing in which learning data is generated by changing attribute information (label) by adding information indicating that no defect is included to the measurement image may be executed as well.

The inspection apparatus 100 acquires a measurement image of the object to be inspected (S50), and determines whether or not the measurement image includes a defect using an identification device trained by the first learning unit 130 and the second learning unit 140 (S51). Then, the extraction unit 123 extracts a partial image of the image based on which the determination has been made (S52).

The inspection apparatus 100 displays the measurement image and an image in which the partial image has been emphasized, in the display unit of the user interface 170, in a superimposed manner such that they can be compared (S53). With this, the second operator can be provided with material based on which whether or not the determination result is correct can be determined. Note that the inspection apparatus 100 may also display, in the display unit of the user interface 170, the measurement image and the image in which a partial image has been emphasized side by side such that they can be compared.

The inspection apparatus 100 accepts an input indicating whether or not the determination result is correct that has been made using the input unit of the user interface 170 (S54). If an input indicating that the determination result is correct is accepted (S55: YES), the fourth processing is ended. On the other hand, if the determination unit 152 determined that the image includes a defect, and an input indicating that the result determined by the determination unit 152 is not correct is made using the input unit (S55: NO), the generation unit 121 adds information indicating that at least the partial image does not include a defect to the measurement image (S56).

Thereafter, the communication unit 125 inquires of the authorized person whether or not the measurement image may be registered as new learning data (S57). Here, the communication unit 125 may transmit data which serves as material based on which the authorized person makes a determination, such as the measurement image based on which composition has been made, and an image in which the partial image has been emphasized.

If the authorized person determines that the image data can be registered as new learning data (S58: YES), the generation unit 121 generates a measurement image with which information indicating that no defect is included is associated, as new learning data, and stores the new learning data to the corrected image DB 122 (S59). On the other hand, if the authorized person determines that the image data is not allowed to be registered as new learning data (S58: NO), the processing is ended without registering the learning data. Then, the fourth processing is ended.

With the inspection apparatus 100 according to one or more embodiments, learning data in which the fact that a partial image based on which the determination unit 152 has determined that a defect is included does not include a defect is indicated is generated, and learning data can be generated with which the number of erroneous determinations where an image that does not actually include a defect is determined to include a defect can be reduced.

The embodiments described above are for the purpose of facilitating understanding of the present invention, and is not to be interpreted as limiting the present invention. Constituent elements of the embodiments and arrangement, materials, conditions, shapes and sizes thereof are not limited to those exemplified, and can be changed as appropriate. In addition, configurations described in different embodiments can be partially substituted or combined.

Note 1

An inspection apparatus (100) including:

an image capturing apparatus (153) configured to capture an image of an object to be inspected:

a determination unit (152) configured to determine whether or not the image includes a defect using an identification device (a, b, c, A, B) that has been trained using learning data:

a display unit (170) configured to display the image and a determination result by the determination unit (152);

an input unit (170) configured to accept an input indicating whether or not the determination result is correct;

an extraction unit (123) configured to extract a partial image of the image based on which the determination has been made; and a generation unit (121) configured to generate new learning data based on the partial image, if the input unit (170) has accepted an input indicating that the determination result is not correct.

Note 2

The inspection apparatus according to Note 1, wherein the generation unit (121) is configured to, if the determination unit (152) has determined that the image includes a defect, and the input unit (170) has accepted an input indicating that the determination result is not correct, generate the new learning data by associating the image with information indicating that the partial image does not include a defect.

Note 3

The inspection apparatus according to Note 1 or 2, wherein the generation unit (121) is configured to, if the determination unit (152) has determined that the image includes a defect, and the input unit (170) has accepted an input indicating that the determination result is not correct, generate a composite image by combining the partial image and an image that is different from the image from which the partial image has been extracted, and generate the new learning data by associating the composite image with information indicating that no defect is included.

Note 4

The inspection apparatus according to Note 3, further including a verification unit (124) that is configured to cause the determination unit (152) to determine whether or not the composite image includes a defect, and verify whether or not a determination result similar to that obtained when the determination unit (152) is caused to determine whether or not the image from which the partial image has been extracted includes a defect is obtained.

Note 5

The inspection apparatus according to Note 3 or 4, wherein the input unit (170) accepts an input of a cause of erroneous determination by the determination unit (152), and the generation unit (121) selects an image of an object to be inspected that does not include a defect, based on the cause, and generates a composite image by combining the partial image and the selected image.

Note 6

The inspection apparatus according to Note 3 or 4, wherein the input unit (170) accepts an input of a cause of erroneous determination by the determination unit (152), and the display unit (170) displays data for calling attention to a possible defect in a process of capturing an image of the object to be inspected, based on the cause.

Note 7

The inspection apparatus according to any one of Notes 1 to 6, wherein the extraction unit (123) extracts the partial image based on which the determination has been made such that a region of the image whose degree of contribution to the determination result is a predetermined value or more is included.

Note 8

The inspection apparatus according to any one of Notes 1 to 7, wherein the determination unit (152) determines whether or not the image includes a plurality of defects, the input unit (170) accepts, for each of the plurality of defects, an input indicating whether or not the determination result is correct the extraction unit (123) extracts a partial image of the image based on which the determination has been made regarding one of the plurality of defects, with respect to which the input unit (170) has accepted an input indicating that the determination result is not correct, and the generation unit (121) generates new learning data based on the partial image.

Note 9

The inspection apparatus according to any one of Notes 1 to 8, further including a communication unit (125) configured to inquire of an authorized person as to whether or not the new learning data should be registered, when the generation unit (121) generates the new learning data.

Note 10

The inspection apparatus according to any one of Notes 1 to 9, wherein the display unit (170) displays the image and an image in which a partial image of the image is emphasized.

Note 11

The inspection apparatus according to Note 10, wherein the display unit (170) displays the image and an image in which a partial image of the image is emphasized such that these images can be compared to each other, or in a superimposed manner.

Note 12

The inspection apparatus according to any one of Notes 1 to 11, wherein the display unit (170) displays the image and identification information of the object to be inspected.

Note 13

The inspection apparatus according to any one of Notes 1 to 12, wherein the display unit (170) displays the image and an image of an object to be inspected including a defect that was acquired in the past or an image of the object to be inspected not including a defect that was acquired in the past.

Note 14

The inspection apparatus according to any one of Notes 1 to 13, wherein the display unit (170) displays the image and an image determined, in the past, by the determination unit (152) to include a defect, or an image determined, in the past, by the determination unit (152) to not include a defect.

Note 15

A data generation apparatus including:

an acquisition unit (153) configured to acquire an image of an object to be inspected;

a determination unit (152) configured to determine, based on the image, whether or not the object to be inspected includes a defect, using an identification device (a, b, c, A, B) that has been trained using learning data;

an input unit (170) configured to accept an input indicating whether or not a determination result by the determination unit (152) is correct;

an extraction unit (123) configured to extract a partial image of the image based on which the determination has been made; and a generation unit (121) configured to, if the input unit (170) has accepted an input indicating that the determination result is not correct, generate new learning data based on the partial image.

Note 16

A data generation method including:

acquiring an image of an object to be inspected;

determining, based on the image, whether or not the object to be inspected includes a defect, using an identification device (a, b, c, A, B) that has been trained using learning data;

accepting an input indicating whether or not a determination result obtained in the determining is correct;

extracting a partial image of the image based on which the determination has been made; and generating new learning data based on the partial image, if an input indicating that the determination result is not correct has been accepted in the step of accepting an input.

Note 17

A data generation program for causing a computation apparatus (101) included in a data generation apparatus to function as:

an acquisition unit (153) configured to acquire an image of an object to be inspected;

a determination unit (152) configured to determine, based on the image, whether or not the object to be inspected includes a defect, using an identification device (a, b, c, A, B) that has been trained using learning data;

an input unit (170) configured to accept an input indicating whether or not a determination result by the determination unit (152) is correct;

an extraction unit (123) configured to extract a partial image of the image based on which the determination has been made; and a generation unit (121) configured to, if the input unit (170) has accepted an input indicating that the determination result is not correct, generate new learning data based on the partial image.

The invention claimed is:

1. An inspection apparatus comprising:
    an image capturing apparatus that captures an image of an object to be inspected; and
    a processor configured with a program to perform operations comprising:
        operation as a determination unit configured to determine, based on the image, whether the object to be inspected includes a defect, using an identification device trained using learning data:
        operation as a display unit configured to display the image and a determination result by the determination unit;
        operation as an input unit configured to accept an input indicating whether the determination result of the determination unit is correct or not correct by determining whether the determination result has detected a defect when no defect exits or has detected no defect when a defect exists;
        operation as an extraction unit configured to extract a partial image of the image based on which the determination result being correct or not correct has been made; and
        operation as a generation unit configured to generate new learning data based on the partial image, if the input unit has accepted an input indicating that the determination result is not correct wherein the identification device is trained using the new learning data.

2. The inspection apparatus according to claim 1, wherein the processor is configured with the program to perform operations such that operation as the generation unit comprises operation as the generation unit configured to, if the determination unit has determined that the image includes a defect, and the input unit has accepted an input indicating that the determination result is not correct, generate the new learning data by associating the image with information indicating that the partial image does not include a defect.

3. The inspection apparatus according to claim 1, wherein the processor is configured with the program to perform operations such that operation as the generation unit comprises operation as the generation unit configured to, if the determination unit has determined that the image includes a defect, and the input unit has accepted an input indicating that the determination result is not correct, generate a composite image by combining the partial image and an image different from the image from which the partial image has been extracted, and generate the new learning data by associating the composite image with information indicating that no defect is included.

4. The inspection apparatus according to claim 3, wherein the processor is configured with the program to perform operations further comprising operation as a verification unit configured to cause the determination unit to determine whether the composite image includes a defect, and to verify whether a determination result similar to that obtained when the determination unit is caused to determine whether the image from which the partial image has been extracted includes a defect is obtained.

5. The inspection apparatus according to claim 3,
    wherein the processor is configured with the program to perform operations such that:
    operation as the input unit comprises operation as the input unit that accepts an input of a cause of erroneous determination by the determination unit, and
    operation as the generation unit comprises operation as the generation unit that selects an image of an object to be inspected that does not include a defect, based on the cause, and generates a composite image by combining the partial image and the selected image.

6. The inspection apparatus according to claim 3,
    wherein the processor is configured with the program to perform operations such that:
    operation as the input unit comprises operation as the input unit that accepts an input of a cause of erroneous determination by the determination unit, and
    operation as the display unit comprises operation as the display unit that displays data for calling attention to a possible defect in a process of capturing an image of the object to be inspected, based on the cause.

7. The inspection apparatus according to claim 1, wherein the processor is configured with the program to perform operations such that operation as the extraction unit comprises operation as the extraction unit that extracts the partial image based on which the determination has been made such that a region of the image whose degree of contribution to the determination result has a predetermined value or more is included.

8. The inspection apparatus according to claim 1, wherein the processor is configured with the program to perform operations such that:
operation as the determination unit comprises operation as the determination unit that determines whether the image includes a plurality of defects,
operation as the input unit comprises operation as the input unit that accepts, for each of the plurality of defects, an input indicating whether the determination result is correct,
operation as the extraction unit comprises operation as the extraction unit that extracts a partial image of the image based on which the determination has been made regarding one of the plurality of defects, with respect to which the input unit has accepted an input indicating that the determination result is not correct, and
operation as the generation unit comprises operation as the generation unit that generates new learning data based on the partial image.

9. The inspection apparatus according to claim 1, wherein the processor is configured with the program to perform operations further comprising operation as a communication unit configured to inquire of an authorized person as to whether the new learning data should be registered, when the generation unit generates the new learning data.

10. The inspection apparatus according to claim 1, wherein the processor is configured with the program to perform operations such that operation as the display unit comprises operation as the display unit that displays the image and an image in which a partial image of the image is emphasized.

11. The inspection apparatus according to claim 10, wherein the processor is configured with the program to perform operations such that operation as the display unit comprises operation as the display unit that displays the image and an image in which a partial image of the image is emphasized such that these images can be compared to each other, or in a superimposed manner.

12. The inspection apparatus according to claim 1, wherein the processor is configured with the program to perform operations such that operation as the display unit comprises operation as the display unit that displays the image and identification information of the object to be inspected.

13. The inspection apparatus according to claim 1, the processor is configured with the program to perform operations such that operation as the display unit comprises operation as the display unit that displays the image and an image of an object to be inspected including a defect that was acquired in the past or an image of the object to be inspected not including a defect that was acquired in the past.

14. The inspection apparatus according to claim 1, the processor is configured with the program to perform operations such that operation as the display unit comprises operation as the display unit that displays the image and an image determined, in the past, by the determination unit to include a defect, or an image determined, in the past, by the determination unit to not include a defect.

15. A data generation apparatus comprising a processor configured with a program to perform operations comprising:
operation as an acquisition unit configured to acquire an image of an object to be inspected;
operation as a determination unit configured to determine, based on the image, whether the object to be inspected includes a defect, using an identification device that has been trained using learning data;
operation as an input unit configured to accept an input indicating whether a determination result made by the determination unit is correct or not correct by determining whether the determination result has detected a defect when no defect exits or has detected no defect when a defect exists;
operation as an extraction unit configured to extract a partial image of the image based on which the determination result being correct or not correct has been made; and
operation as a generation unit configured to, if the input unit has accepted an input indicating that the determination result is not correct, generate new learning data based on the partial image, and training the identification device using the new learning data.

16. A data generation method comprising:
acquiring an image of an object to be inspected;
determining, based on the image, whether the object to be inspected includes a defect, using an identification device that has been trained using learning data;
accepting an input indicating whether a determination result obtained in the determining is correct or not correct by determining whether the determination result has detected a defect when no defect exits or has detected no defect when a defect exists;
extracting a partial image of the image based on which the determination result being correct or not correct has been made; and
generating new learning data based on the partial image, if an input indicating that the determination result is not correct has been accepted in accepting the input, and training the identification device using the new learning data.

17. A non-transitory computer-readable storage medium storing a data generation program, which when read and executed, causes a computation apparatus included in a data generation apparatus to perform operations comprising:
acquiring an image of an object to be inspected;
determining, based on the image, whether the object to be inspected includes a defect, using an identification device that has been trained using learning data;
accepting an input indicating whether a determination result made by the determination unit is correct or not correct by determining whether the determination result has detected a defect when no defect exits or has detected no defect when a defect exists;
extracting a partial image of the image based on which the determination result being correct or not correct has been made; and
if the input unit has accepted an input indicating that the determination result is not correct, generating new learning data based on the partial image, and training the identification device using the new learning data.

* * * * *